US012233782B2

(12) United States Patent
Ikeda et al.

(10) Patent No.: US 12,233,782 B2
(45) Date of Patent: Feb. 25, 2025

(54) INFORMATION PROCESSING APPARATUS, INFORMATION PROCESSING METHOD, AND INFORMATION PROCESSING SYSTEM

(71) Applicant: SONY GROUP CORPORATION, Tokyo (JP)

(72) Inventors: Tetsuo Ikeda, Tokyo (JP); Maho Hayashi, Tokyo (JP); Hiroshi Imamura, Tokyo (JP); Mikinori Matsuda, Tokyo (JP); Yuya Takayama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/548,237

(22) PCT Filed: Mar. 2, 2022

(86) PCT No.: PCT/JP2022/008739
§ 371 (c)(1),
(2) Date: Aug. 29, 2023

(87) PCT Pub. No.: WO2022/190970
PCT Pub. Date: Sep. 15, 2022

(65) Prior Publication Data
US 2024/0174174 A1 May 30, 2024

(30) Foreign Application Priority Data

Mar. 8, 2021 (JP) ................................. 2021-036143

(51) Int. Cl.
*G06V 20/58* (2022.01)
*B60R 1/00* (2022.01)
(Continued)

(52) U.S. Cl.
CPC .............. *B60R 1/001* (2013.01); *G06F 3/011* (2013.01); *G06T 19/006* (2013.01); *G06V 20/58* (2022.01); *B60R 2300/308* (2013.01)

(58) Field of Classification Search
CPC ... B60R 1/001; B60R 2300/308; G06F 3/011; G06V 20/58
(Continued)

(56) References Cited

U.S. PATENT DOCUMENTS 7,884,784 B2 * 2/2011 Repetto .................. G02B 27/01
345/82
10,864,856 B2 * 12/2020 Kusayanagi ............ B60R 1/002
(Continued)

FOREIGN PATENT DOCUMENTS

JP 2012-068481 A 4/2012
JP 2013-131222 A 7/2013
(Continued)

OTHER PUBLICATIONS

International Search Report and Written Opinion of PCT Application No. PCT/JP2022/008739, issued on May 24, 2022, 09 pages of ISRWO.

*Primary Examiner* — Calvin C Ma
(74) *Attorney, Agent, or Firm* — CHIP LAW GROUP

(57) ABSTRACT

Provided are an information processing apparatus, an information processing method, and an information processing system that are able to appropriately superimpose content on a scene visible from within a mobile body. The information processing apparatus includes a recognition section and a display control section. The recognition section recognizes a scene visible from within the mobile body through a transparent or translucent display surface provided in the mobile
(Continued)

body. The display control section controls display of the content on the display surface according to the recognized scene.

18 Claims, 48 Drawing Sheets

(51) Int. Cl.
*G06F 3/01* (2006.01)
*G06T 19/00* (2011.01)

(58) Field of Classification Search
USPC .............................................................. 345/7
See application file for complete search history.

(56) References Cited

U.S. PATENT DOCUMENTS

| | | | |
|---|---|---|---|
| 2020/0029128 A1* | 1/2020 | Erskine | ............ H04N 21/25866 |
| 2020/0184219 A1 | 6/2020 | Mugura | |
| 2020/0249044 A1 | 8/2020 | Watanabe | |

FOREIGN PATENT DOCUMENTS

| | | |
|---|---|---|
| JP | 2017-109656 A | 6/2017 |
| JP | 2017-151981 A | 8/2017 |
| JP | 2017-191378 A | 10/2017 |
| JP | 2021-029652 A | 3/2021 |
| WO | 2017/047178 A1 | 3/2017 |
| WO | WO-2020166252 A1 | 8/2020 |
| WO | WO-2020234939 A1 | 11/2020 |

\* cited by examiner

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2022/008739 filed on Mar. 2, 2022, which claims priority benefit of Japanese Patent Application No. JP 2021-036143 filed in the Japan Patent Office on Mar. 8, 2021. Each of the above-referenced applications is hereby incorporated herein by reference in its entirety.

TECHNICAL FIELD

The present technology relates to an information processing apparatus, an information processing method, a program, and an information processing system, and more specifically, relates to an information processing apparatus, an information processing method, a program, and an information processing system that are suitable for use in a case where content is to be superimposed on a scene visible from within a mobile body.

BACKGROUND ART

Conventionally proposed is a video see-through system that superimposes content on a captured image of a scene outside a vehicle, and causes a monitor in the vehicle to display the content superimposed on the captured image (see, for example, PTLs 1 and 2).

Further, there is an existing see-through system that superimposes content on a scene visible from within a vehicle through a vehicle window by displaying the content on the vehicle window.

CITATION LIST

Patent Literature

[PTL 1]
Japanese Patent Laid-open No. 2017-109656
[PTL 2]
Japanese Patent Laid-open No. 2013-131222

Summary

Technical Problem

It is desired that the above-described see-through systems be able to superimpose content more appropriately.

The present technology has been made in view of the above circumstances, and is intended to appropriately superimpose content on a scene visible from within a vehicle or other mobile body.

Solution to Problem

An information processing apparatus according to a first aspect of the present technology includes a recognition section that recognizes a scene visible from within a mobile body through a transparent or translucent display surface provided in the mobile body, and a display control section that controls display of content on the display surface according to the recognized scene.

An information processing method according to the first aspect of the present technology includes recognizing a scene visible from within a mobile body through a transparent or translucent display surface provided in the mobile body, and controlling display of content on the display surface according to the recognized scene.

A program according to the first aspect of the present technology causes a computer to execute a process including recognizing a scene visible from within a mobile body through a transparent or translucent display surface provided in the mobile body, and controlling display of content on the display surface according to the recognized scene.

The first aspect of the present technology a scene visible from within a mobile body through a transparent or translucent display surface provided in the mobile body is recognized, and display of content on the display surface is controlled according to the recognized scene.

An information processing system according to a second aspect of the present technology includes a display section that includes a transparent or translucent display surface for transmitting light from an outside of a mobile body, a recognition section that recognizes a scene visible from within the mobile body through the display surface, and a display control section that controls display of content on the display surface according to the recognized scene.

The second aspect of the present technology a scene visible from within a mobile body through a transparent or translucent display surface that is included in a display section and configured to transmit light from the outside of the mobile body is recognized, and display of content on the display surface is controlled according to the recognized scene.

BRIEF DESCRIPTION OF DRAWINGS

FIGS. 22A and 20B depict diagrams illustrating an example of a positional relation between a target object and a plurality of target users lined up horizontally.

DESCRIPTION OF EMBODIMENTS

Embodiments for implementing the present technology will now be described in the following order.
1. Embodiments
2. Advantages of Present Technology
3. Modifications
4. Miscellaneous 1. Embodiments The embodiments of the present technology will be described with reference to FIGS. 1, 2, 3A, 3B, 4A, 4B, 5A, 5B, 6, 7, 8, 9, 10, 11, 12, 13, 14, 15, 16, 17, 18, 19, 20A, 20B, 20C, 21, 22A, 22B, 23A, 23B, 24, 25A, 25B, 26, 27, 28, 29A, 29B, 30A, 30B, 31A, 31B, 32, 33, 34, 35, 36, 37, 38, 39, 40, 41, 42, 43, 44, 45, 46, and 47.

Example Configuration of Information Processing System 1

Figure 1:
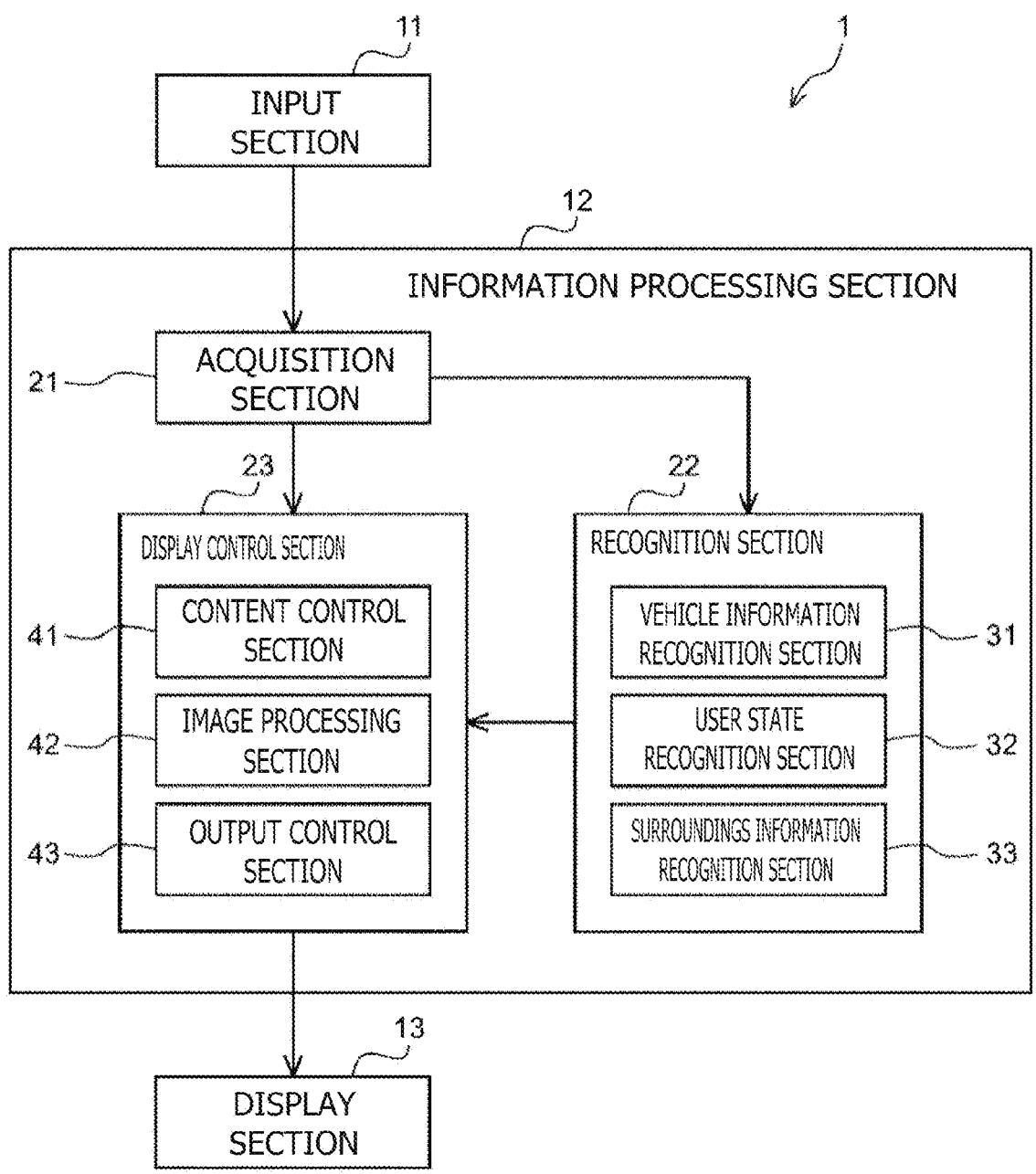
FIG. 1 is a block diagram illustrating an embodiment of an information processing system according to the present technology.

FIG. 1 is a block diagram illustrating an embodiment of an information processing system 1 according to the present technology.

The information processing system 1 is disposed in a vehicle or other mobile body. The information processing system 1 is a system that displays content on a transparent or translucent display section disposed in the mobile body, and thus superimposes the content on a scene visible from within the mobile body through the display section. The content displayed by the information processing system 1 is, for example, information presented with respect to the scene or an object in the scene (hereinafter referred to as the presentation information), a game play screen, and the like. The presentation information includes, for example, information regarding the scene or the object in the scene (hereinafter referred to as the related information).

Now, the following describes an example where the information processing system 1 is disposed in a vehicle.

The information processing system 1 includes an input section 11, an information processing section 12, and a display section 13.

The input section 11 acquires data (hereinafter referred to as input data) that includes, for example, data used to recognize information regarding the vehicle in which the information processing system 1 is disposed, the state of a user in the vehicle, and information regarding surroundings of the vehicle, and additionally includes display data used for displaying the content to be displayed in the vehicle. The input section 11 inputs the acquired input data to an acquisition section 21 in the information processing section 12.

The following describes a specific example of the input data.

For example, the input section 11 includes a key, a button, a switch, a touch panel, a touch sensor, a microphone, and other input devices used for user operations. The input section 11 receives data inputted through the input device (e.g., data indicating description of a user operation) as the input data, and inputs the received input data to the acquisition section 21 in the information processing section 12.

For example, the input section 11 includes an image sensor, a depth sensor, an ultrasonic sensor, a radar, a LiDAR sensor, and other sensors used for sensing the inside and outside of the vehicle. The image sensor includes, for example, a visible light camera, an infrared camera, and the like. The depth sensor includes, for example, a stereo camera, a ToF (Time of Flight) sensor, and the like. For example, the input section 11 includes a speed sensor, an acceleration sensor, an angular rate sensor, and other sensors used for recognizing a state of the vehicle. The input section 11 receives various pieces of sensing data outputted from the sensors as the input data, and inputs the received input data to the acquisition section 21 in the information processing section 12.

For example, the input section 11 includes a satellite positioning system that is used to recognize the current location of the vehicle. The input section 11 receives positioning data, which is received from a positioning satellite by the satellite positioning system, as the input data, and inputs the received input data to the acquisition section 21 in the information processing section 12.

For example, the input section 11 acquires content display data and the information regarding the surroundings of the vehicle from a server outside the vehicle or a database in the vehicle which are not depicted. It should be noted that, in the case of acquiring the content display data and the information regarding the surroundings of the vehicle from the server outside the vehicle, the input section 11 communicates with the server outside the vehicle through undepicted means of communication. Any wireless communication method can be adopted as the method of communicating with the server outside the vehicle. The information regarding the surroundings of the vehicle includes, for example, information regarding tourist spots, buildings, facilities, stores, restaurants, and the like around the vehicle. The content display data includes, for example, display data for a game play screen, display data related to the information regarding the surroundings of the vehicle (e.g., image data of tourist spots), and the like. The input section 11 acquires the content display data and the information regarding the surroundings of the vehicle, for example, from the server outside the vehicle or the database in the vehicle as the input data, and inputs the acquired input data to the acquisition section 21 in the information processing section 12.

The information processing section 12 generates the content to be displayed on the display section 13 and controls a content display operation of the display section 13, according to the input data. The information processing section 12 includes the acquisition section 21, a recognition section 22, and a display control section 23.

The acquisition section 21 acquires the input data, which is inputted from the input section 11, and supplies the acquired input data to the recognition section 22 and the display control section 23.

The recognition section 22 performs various types of recognition processes according to the input data, and supplies information indicating a result of recognition to the display control section 23. The recognition section 22 includes a vehicle information recognition section 31, a user state recognition section 32, and a surroundings information recognition section 33.

According to the input data, the vehicle information recognition section 31 recognizes the information regarding the vehicle in which the information processing system 1 is disposed (hereinafter referred to as the vehicle information). It is conceivable that, for example, data from the speed sensor, data from the acceleration sensor, data from the angular rate sensor, positioning data from the satellite positioning system, or a combination of these pieces of data may be adopted as the input data for use in vehicle information recognition processing. The vehicle information includes, for example, information regarding the state of the vehicle (e.g., speed and current location). The vehicle information recognition section 31 supplies the vehicle information to the display control section 23.

The user state recognition section 32 recognizes the state of the user in the vehicle (hereinafter referred to as the user state) according to the input data. It is conceivable that, for example, image data from the image sensor, data from the depth sensor, data from the ultrasonic sensor, or a combination of these pieces of data may be adopted as the input data for use in user state recognition processing. For example, the user state recognition section 32 uses the OpenPose library or other human body analysis library to recognize the user state, such as the number, positions, face orientations, lines of sight, and motions (e.g., gestures) of users in the vehicle. The user state recognition section 32 supplies information indicating a result of user state recognition (hereinafter referred to as the user state information) to the display control section 23.

Further, the user state recognition section 32 recognizes a user targeted for content display (hereinafter referred to as the target user) according to the state of each user in the vehicle. The target user is, for example, a user who possibly views the content. The user state recognition section 32 supplies information indicating the result of target user recognition (hereinafter referred to as the target user information) to the display control section 23.

The surroundings information recognition section 33 recognizes the information regarding the surroundings of the vehicle (hereinafter referred to as the surroundings information) according to the input data. It is conceivable that, for example, the image data from the image sensor, the data from the depth sensor, the data from the ultrasonic sensor, the data from the LiDAR sensor, or vehicle surroundings information acquired from the server outside the vehicle or the database in the vehicle may be adopted as the input data for use in surroundings information recognition processing. It is alternatively conceivable that, for example, a combination of these pieces of data may be adopted as the input data for use in user state recognition processing. For example, the surroundings information recognition section 33 recognizes a scene around the vehicle. More specifically, the surroundings information recognition section 33 recognizes a location where a scene around the vehicle is present, and, for example, the attributes, locations, and motions of objects in the scene. The objects to be recognized may be a mobile body (including a human or other living being) or a stationary object. The attributes of the objects to be recognized include, for example, the types, names, sizes, shapes of the objects, and the like. For example, the surroundings information recognition section 33 recognizes the states of the surroundings of the vehicle (e.g., weather, brightness, and the like). The surroundings information recognition section 33 supplies the surroundings information to the display control section 23.

Further, the surroundings information recognition section 33 extracts, from objects in the scene, a target object that is targeted for information presentation. The surroundings information recognition section 33 supplies information regarding the extracted target object (hereinafter referred to as the target object information) to the display control section 23. The target object information includes, for example, the attribute, location, and motion of the target object.

The display control section 23 includes a control layer of an OS (Operating System) that provides multi-content drawing control, for example, of an application display window and the like and distributes a touch event and other operating events to individual pieces of content. Further, the display control section 23 controls the content display operation of the display section 13 according to, for example, the input data, the vehicle information, the user state information, the target user information, the surroundings information, the target object information, and the like. The display control section 23 includes a content control section 41, an image processing section 42, and an output control section 43.

The content control section 41 controls the content to be displayed by the display section 13 according to, for example, the input data, the vehicle information, the user state information, the target user information, the surroundings information, the target object information, and the like. It is conceivable that, for example, the data inputted through the input device (e.g., data corresponding to a user operation, and the like) and the content display data acquired, for example, from the server outside the vehicle or the database in the vehicle may be adopted as the input data for use in content control. For example, the content control section 41 controls the description, display position, and motion of the content, and the method for displaying the content.

The image processing section 42 generates image data for causing the display section 13 to display the content according to the description, display position, and motion of the content, the method for displaying the content, and the like, which are set by the content control section 41 (the image data generated as described above is hereinafter referred to as the content image data). At this time, the image processing section 42 uses, as needed, the content display data that is acquired, for example, from the server outside the vehicle or the database in the vehicle and included in the input data.

The output control section 43 controls how the content image data, which is generated by the image processing section 42, is outputted to the display section 13.

The display section 13 includes a transparent or translucent display surface that transmits light from the outside of the vehicle. The user in the vehicle is able to view a scene outside the vehicle through the display surface. The display section 13 displays content on the display surface according to the content image data. As a result, the content is superimposed on a scene that is visible from the inside of the vehicle through the display surface.

Example of Sensor Arrangement

Figure 2:
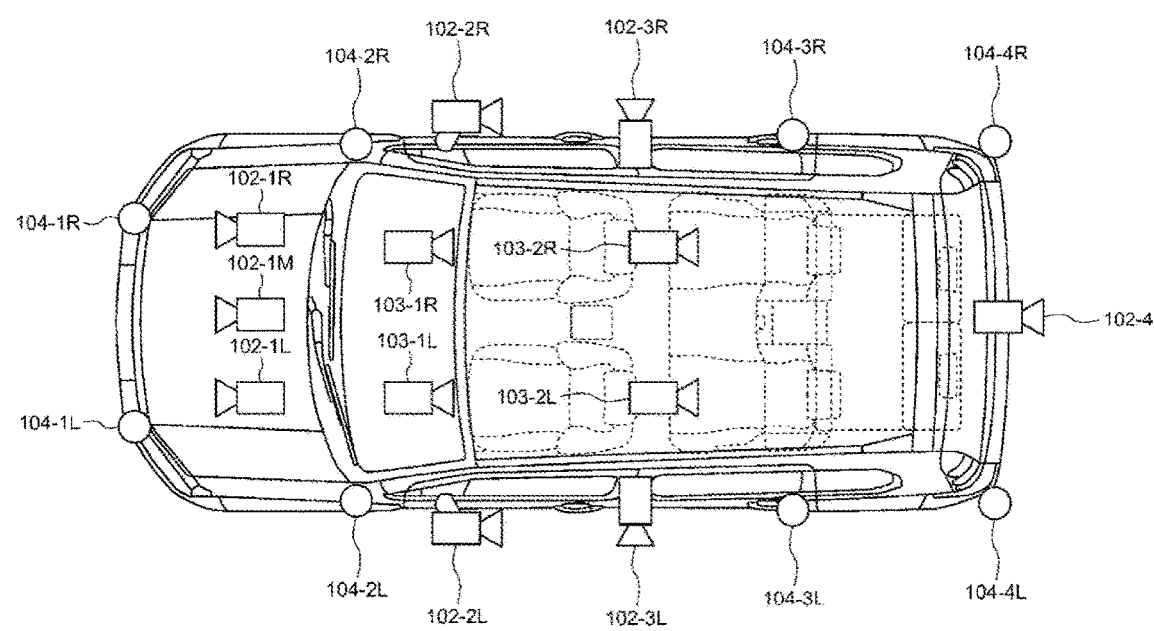
FIG. 2 is a diagram illustrating an example of arrangement of vehicle sensors.

FIG. 2 illustrates an example of arrangement of sensors of a vehicle 101 in which the information processing system 1 is disposed.

The input section 11 of the information processing system 1 includes, for example, RGB cameras 102-1L to 102-4, ToF sensors 103-1L to 103-2R, and ultrasonic sensors 104-1L to 104-4R.

The RGB cameras 102-1L to 102-4 capture the images of an area around the vehicle 101 to acquire the images of the surroundings of the vehicle 101 (hereinafter referred to as the surroundings image). For example, the RGB cameras 102-1L, 102-1M, and 102-1R capture the images of an area in front of the vehicle 101. The RGB cameras 102-1L and 102-1R constitute, for example, a stereo camera. The RGB camera 102-2L captures the image of an area to the left rear of the vehicle 101. The RGB camera 102-2R captures the image of an area to the right rear of the vehicle 101. The RGB camera 102-3L captures the image of an area to the left of the vehicle 101. The RGB camera 102-3R captures the image of an area to the right of the vehicle 101. The RGB camera 102-4 captures the image of an area behind the vehicle 101.

The ToF sensors 103-1L to 103-2R capture the images of users in the vehicle for use in user state recognition. For example, the ToF sensor 103-1L captures the image of a user sitting on a left front seat of the vehicle 101. The ToF sensor 103-1R captures the image of a user sitting on a right front seat of the vehicle 101. The ToF sensor 103-2L captures the image of a user sitting on a left back seat of the vehicle 101. The ToF sensor 103-2R captures the image of a user sitting on a right back seat of the vehicle 101.

The ultrasonic sensors 104-1L to 104-4R detect objects around the vehicle 101. For example, the ultrasonic sensor 104-1L detects objects in an area to the left front of the vehicle 101. The ultrasonic sensor 104-1R detects objects in an area to the right front of the vehicle 101. The ultrasonic sensor 104-2L detects objects in an area in front of and to the left of the vehicle 101. The ultrasonic sensor 104-2R detects objects in an area in front of and to the right of the vehicle 101. The ultrasonic sensor 104-3L detects objects in an area behind and to the left of the vehicle 101. The ultrasonic sensor 104-3R detects objects in an area behind and to the right of the vehicle 101. The ultrasonic sensor 104-4L detects objects in an area to the rear left of the vehicle 101. The ultrasonic sensor 104-4R detects objects in an area to the right rear of the vehicle 101.

Additionally, for example, a radar, a LiDAR (Light Detection and Ranging) sensor, and the like are mounted on the vehicle 101.

Specific Example of Display Section 13

A specific example of a configuration of the display section 13 will now be described with reference to FIGS. 3A, 3B, 4A, 4B, 5A, and 5B.

Figure 3A:
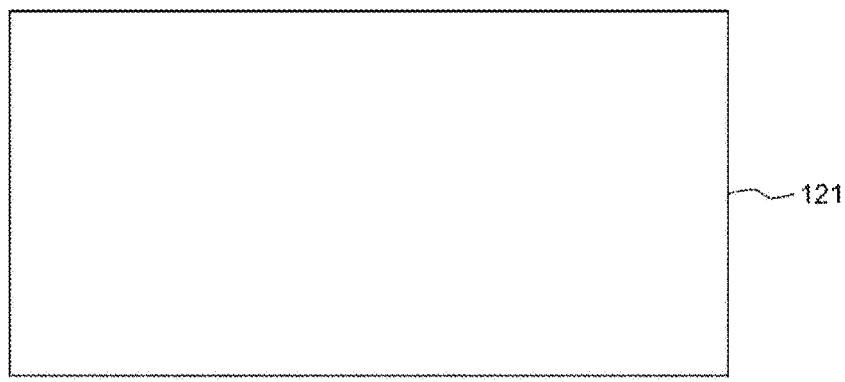
FIGS. 3A and 3B depict diagrams illustrating a first example configuration of a display section.
Figure 3B:
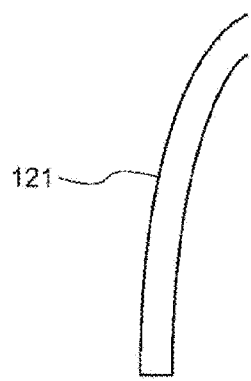

FIGS. 3A and 3B illustrate an example where the display section 13 includes a transparent display panel 121 such as a transparent LCD (Liquid Crystal Display) or a transparent OLED (Organic Light Emitting Diode) display. FIG. 3A is a front view illustrating the display panel 121 as viewed from the inside of the vehicle. FIG. 3B is a side view illustrating the display panel 121.

In the above example, a window of the vehicle 101 (e.g., a side window of the vehicle) includes the display panel 121. Further, when the display panel 121 displays an image, content is superimposed on a scene visible from the inside of the vehicle through the display panel 121, which is a window of the vehicle 101. That is, see-through AR (Augmented Reality) is implemented. Consequently, a plurality of users is able to simultaneously view the content that is superimposed on the scene visible from the inside of the vehicle.

Figure 4A:
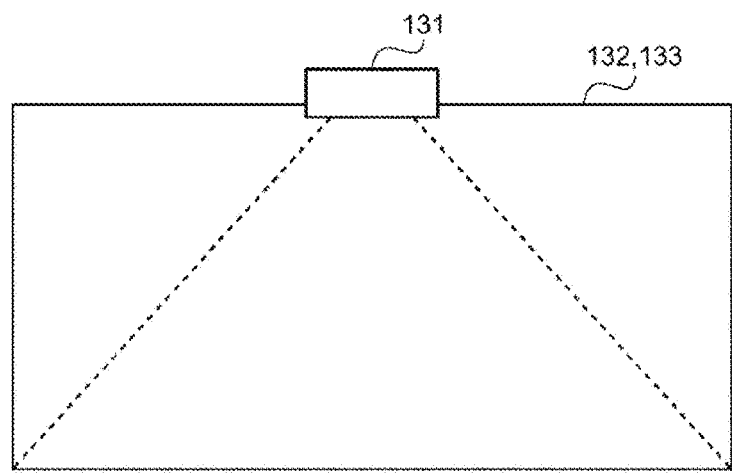
FIGS. 4A and 4B depict diagrams illustrating a second example configuration of the display section.
Figure 4B:
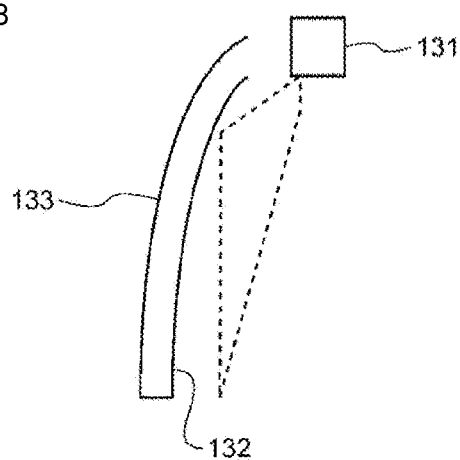

FIGS. 4A and 4B illustrate an example where the display section 13 includes a short throw projector 131 and a transparent reflective film 132. FIG. 4A is a front view illustrating a window 133 (e.g., a side window of the vehicle) affixed with the reflective film 132, as viewed from the inside of the vehicle. FIG. 4B is a side view illustrating the window 133 affixed with the reflective film 132.t In the above example, the short throw projector 131 is disposed above the window 133, and the reflective film 132 is affixed to the inner surface of the window 133. Further, when the short throw projector 131 projects an image onto the reflective film 132 from above, content is superimposed on a scene visible from the inside of the vehicle through the window 133. That is, see-through AR is implemented. Consequently, a plurality of users is able to simultaneously view the content that is superimposed on the scene visible from the inside of the vehicle.

Figure 5A:
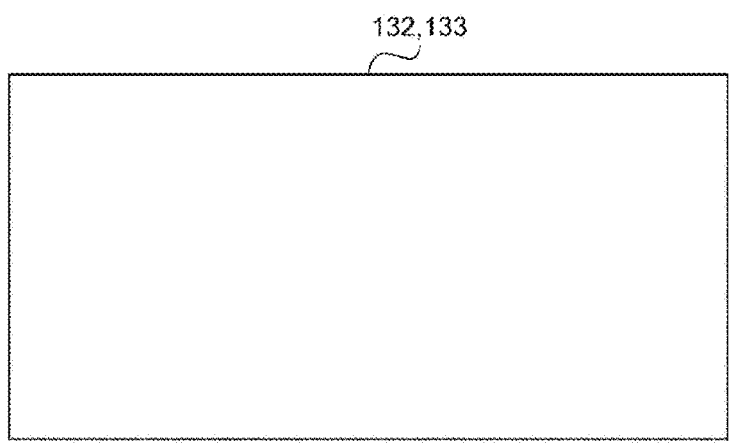
FIGS. 5A and 5B are diagrams illustrating a third example configuration of the display section.
Figure 5B:
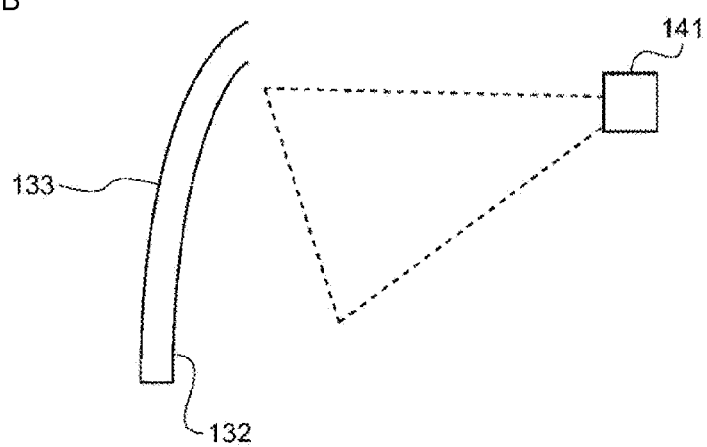

FIGS. 5A and 5B illustrate an example where a projector 141 is disposed in place of the short throw projector 131 which is depicted in FIGS. 4A and 4B. FIG. 5A is a front view illustrating the window 133 affixed with the reflective film 132, as viewed from the inside of the vehicle. FIG. 5B is a side view illustrating the window 133 affixed with the reflective film 132. It should be noted that component elements corresponding to those in FIGS. 4A and 4B are designated by the same reference numerals as their counterparts, and that the descriptions of such component elements will be omitted as appropriate.

In the above example, the projector 141 is disposed in the vehicle 101 and positioned in front of the window 133. Further, when the projector 141 projects an image onto the reflective film 132, content is superimposed on a scene visible from the inside of the vehicle through the window 133. That is, see-through AR is implemented. Consequently, a plurality of users is able to simultaneously view the content that is superimposed on the scene visible from the inside of the vehicle.

Now, the following describes an example where the display section 13 is configured as depicted in FIGS. 4A and 4B. Further, the following description assumes that a window of the vehicle 101 is affixed with a reflective film.

Example of Content Display

Figure 6:
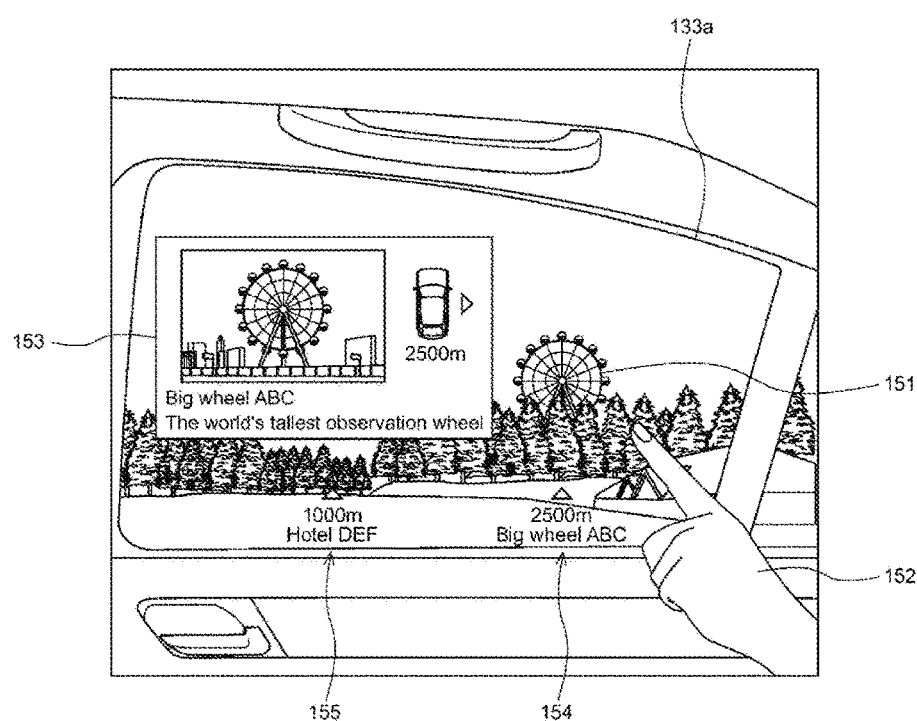
FIG. 6 is a diagram illustrating an example of content display.
Figure 7:
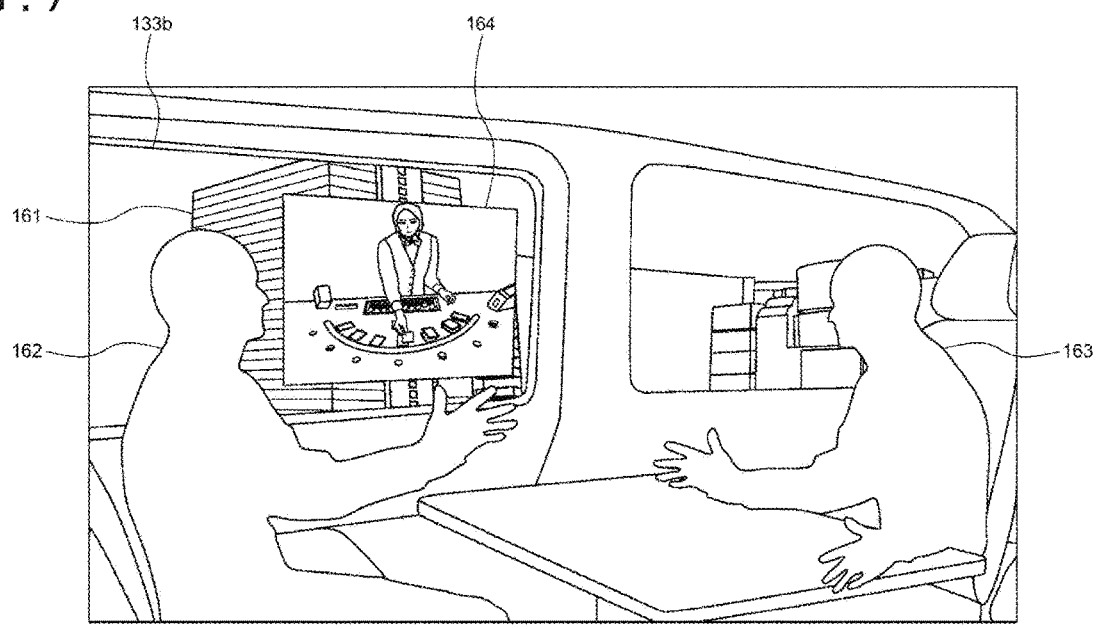
FIG. 7 is a diagram illustrating an example of content display.
Figure 8:
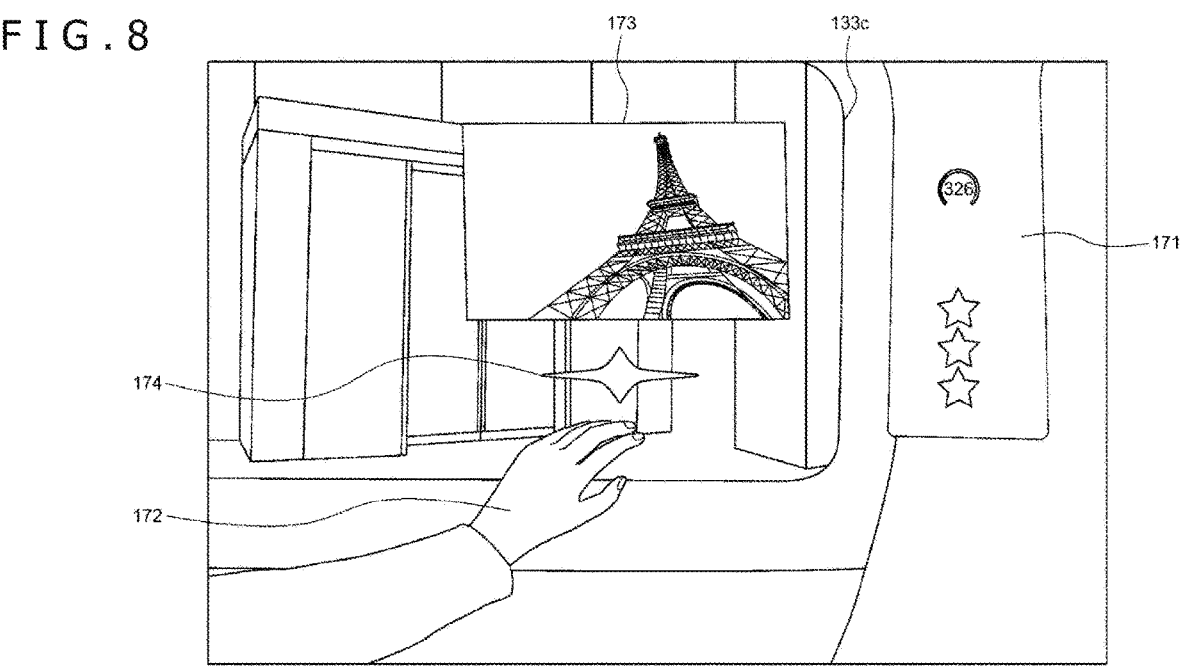
FIG. 8 is a diagram illustrating an example of content display.

FIGS. 6 to 8 illustrate examples of content display.

FIGS. 6 and 7 illustrate examples where displayed content includes the related information regarding a scene visible from a window of the vehicle 101 or regarding an object in the scene.

More specifically, in the example of FIG. 6, a Ferris wheel 151 is visible outside a window 133a. Further, a hand 152 of a user is pointing toward the Ferris wheel 151.

Meanwhile, a display screen 153 containing information regarding the Ferris wheel 151 is displayed on the window 133a. The image and explanation of the Ferris wheel 151 are displayed in the display screen 153. Additionally, the distance and direction of the Ferris wheel 151 with respect to the vehicle 101 are displayed in the display screen 153.

Further, information 154 indicating the name of the Ferris wheel 151 and the distance to the Ferris wheel 151 is displayed in the lower right section of the window 133a. Furthermore, information 155 indicating the name of a hotel being present behind the display screen 153 and the distance to the hotel is displayed in the lower left section of the window 133a.

It should be noted that the actual name of the Ferris wheel is displayed in the "Big Wheel ABC" part of FIG. 6. The actual name of the hotel is displayed in the "Hotel DEF" part of FIG. 6.

Consequently, the user is able to easily acquire the information regarding the Ferris wheel 151.

In the example of FIG. 7, a building 161 is visible outside a window 133b. Further, in the vehicle, users 162 and 163 are viewing toward the window 133b while conversing with each other.

Meanwhile, a display screen 164 containing information regarding the building 161 is displayed on the window 133b. A casino housed in the building 161 is displayed in the display screen 164.

Consequently, the users 162 and 163 are able to easily acquire information regarding the casino in the building 161.

FIG. 8 illustrates an example where displayed content is irrelevant to a scene visible from a window 133c.

In the above example, content is displayed not only on the window 133c but also on a pillar 171 that is disposed adjacent to the right of the window 133c. More specifically, a display screen 173 and an operating member 174 are displayed on the window 133c. The display screen 173 displays information regarding, for example, a tourist spot around a location where the vehicle 101 is running. Further, a user is able to change the display screen to be displayed on the window 133c by making a gesture of moving the operating member 174 to the left or right with a user's hand. Consequently, the user is able to change the information regarding a tourist spot that is to be displayed on the window 133c. Additionally, the pillar 171 displays, for example, an evaluation of a tourist spot displayed in the display screen 173.

It should be noted that content irrelevant, for example, to a view visible to the user through a vehicle window may possibly be displayed on the pillar 171, as another content displayed on the pillar 171. More specifically, for example, an icon necessary for operating the content displayed on the window 133c may possibly be displayed on the pillar 171. Additionally, content the user does not want persons outside the vehicle to view may possibly be displayed on the pillar 171, as another content displayed on the pillar 171.

Consequently, the user is able to easily acquire information regarding tourist spots being present around the vehicle 101.

First Embodiment of Content Display Process

A first embodiment of a content display process executed by the information processing system 1 will now be described with reference to FIG. 9.

This content display process starts, for example, when the user turns on a content display function by use of the input section 11, and ends when the user turns off the content display function.

In step S1, the information processing system 1 acquires various types of information. More specifically, the input section 11 acquires the input data that is used to recognize the information regarding the vehicle 101, the state of the user in the vehicle, and the information regarding the surroundings of the vehicle. The input section 11 inputs the acquired input data to the acquisition section 21.

More specifically, for example, the sensors included in the input section 11, such as the image sensor, the depth sensor, the ultrasonic sensor, the radar, and the LiDAR sensor, perform sensing on the inside and outside of the vehicle to acquire sensing data, and inputs the acquired sensing data to the acquisition section 21 as the input data. For example, the sensors included in the input section 11, such as the speed sensor, the acceleration sensor, and the angular rate sensor, perform sensing on the state of the vehicle to acquire sensing data, and input the acquired sensing data to the acquisition section 21 as the input data.

For example, the satellite positioning system included in the input section 11 receives the positioning data from the positioning satellite, and inputs the received positioning data to the acquisition section 21 in the information processing section 12 as the input data.

For example, the input section 11 acquires the information regarding the surroundings of the vehicle, for example, from the server outside the vehicle, the database in the vehicle, or the like and inputs the acquired information regarding the surroundings of the vehicle to the acquisition section 21 as the input data. For example, the input section 11 acquires the content display data, from the server outside the vehicle, the database in the vehicle, or the like and inputs the acquired content display data to the acquisition section 21 as the input data.

The acquisition section 21 supplies the acquired input data to the recognition section 22 and the display control section 23.

The vehicle information recognition section 31 recognizes, from example, the speed and current location of the vehicle 101, according to some of the input data, such as the data from the speed sensor, the data from the acceleration sensor, the data from the angular rate sensor, the positioning data from the satellite positioning system, or a combination of these pieces of data. The vehicle information recognition section 31 supplies the vehicle information indicating the result of recognition to the display control section 23.

The user state recognition section 32 recognizes the state of each user, including the position, eye height, face orientation, line of sight, and motion of each user in the vehicle, according to some of the input data, such as the image data from the image sensor, the data from the depth sensor, or a combination of these pieces of data. The user state recognition section 32 supplies the user state information indicating the result of recognition to the display control section 23.

The surroundings information recognition section 33 recognizes, for example, the location and attribute of each object in a scene visible from the window 133 of the vehicle 101, according to some of the input data, such as the image data from the image sensor, the data from the depth sensor, the data from the ultrasonic sensor, the data from the LiDAR sensor, the vehicle surroundings information acquired from the server outside the vehicle, the database in the vehicle, or the like, or a combination of these pieces of data. The surroundings information recognition section 33 supplies the vehicle surroundings information indicating a result of recognition to the display control section 23.

In step S2, the user state recognition section 32 achieves target user recognition.

For example, according to the position of each user in the vehicle and the location of a window on which content is to be displayed, the user state recognition section 32 recognizes, as a target user targeted for content display, a user being present at a position where the content is visible. It should be noted that the location of the window on which the content is to be displayed is predetermined known information.

Alternatively, according to, for example, at least either the face orientation or the line of sight of each user in the vehicle, the position of each user, and the location of a window on which the content is to be displayed, the user state recognition section 32 estimates a user who may possibly view the content. Then, the user state recognition section 32 recognizes, as the target user, the user who may possibly view the content.

The user state recognition section 32 supplies, to the display control section 23, the target user information that includes the position and eye height of the target user and at least either the face orientation or line of sight of the target user.

In step S3, the content control section 41 determines, on the basis of the target user information, whether the number of target users is zero. In a case where it is determined that the number of target users is zero, processing returns to step S1. Subsequently, steps S1 to S3 are repeatedly executed until it is determined that the number of target users is not zero.

Meanwhile, in a case where it is determined that the number of target users is not zero, processing proceeds to step S4.

In step S4, the surroundings information recognition section 33 extracts the target object, which is targeted for information presentation. More specifically, according to predetermined conditions, the surroundings information recognition section 33 extracts the target object, which is targeted for information presentation, from among the objects recognized in step S1. For example, as the target object, the content control section 41 extracts an object nearest the vehicle 101 from among the recognized objects having presentable information (e.g., a landmark or the like). The surroundings information recognition section 33 supplies the target object information, including, for example, the attribute, location, and motion of the target object, to the display control section 23.

In step S5, the content control section 41 determines whether or not the target object is present nearby. For example, the content control section 41 calculates the distance between the vehicle 101 and the target object according to the current location of the vehicle 101 and the location of the target object. In a case where the calculated distance is equal to or shorter than a first predetermined threshold, the content control section 41 determines that the target object is present nearby, and processing proceeds to step S6.

In step S6, the content control section 41 determines, on the basis of the target user information, whether or not the number of target users is one. In a case where it is determined that the number of target users is one, processing proceeds to step S7.

Figure 10:
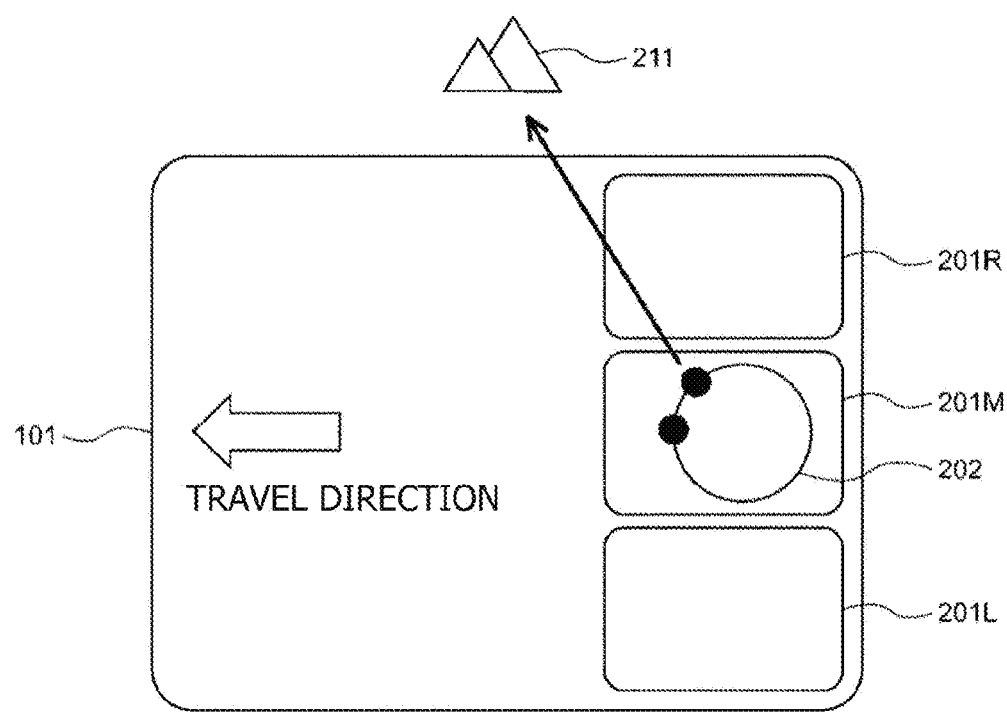
FIG. 10 is a diagram illustrating an example of the positional relation between a target user and a target object.

For example, in a case where, as depicted in FIG. 10, a user 202 is sitting only on a back seat 201M, which is one of three back seats 201L to 201R of the vehicle 101 and content is displayed on a window to the right of the back seats, it is determined that the number of target users is one, and processing proceeds to step S7.

In step S7, the content control section 41 determines, on the basis of the vehicle information, whether or not the vehicle speed is equal to or higher than a predetermined speed. In a case where the speed of the vehicle 101 is lower than a predetermined threshold, the content control section 41 determines that the vehicle speed is neither equal to nor higher than the predetermined speed, and processing proceeds to step S8. It should be noted that, in a case where the vehicle 101 is stopped, it is also determined that the vehicle speed is neither equal to nor higher than the predetermined speed, and processing proceeds to step S8.

In step S8, the information processing system 1 performs an exact superimposition process. The exact superimposition process is a process of achieving superimposition by precisely adjusting the position of the content for a scene (or a target object if it is present) visible from a window of the vehicle 101.

More specifically, according to the location of the target object, the position and line-of-sight direction of the target user, the content display data acquired, for example, from the server outside the vehicle or the database in the vehicle, and the like, the content control section 41 sets the description and display position of the content in such a manner that the content viewed by the target user is exactly superimposed on the target object.

The image processing section 42 generates the content image data for displaying the content whose description and display position are set by the content control section 41.

The output control section 43 supplies the content image data, which is generated by the image processing section 42, to the display section 13.

The display section 13 displays the content according to the content image data. As a result, within the target user's field of view, the content is superimposed on the scene outside the window.

Subsequently, processing returns to step S1 and executes steps S1 and beyond.

Figure 11:
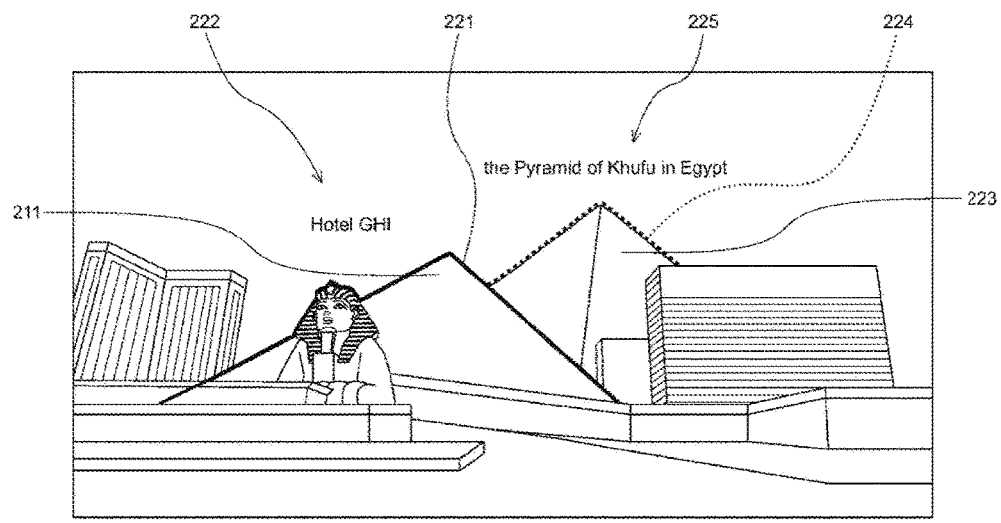
FIG. 11 is a diagram illustrating an example of content display.

FIG. 11 illustrates an example where content and a scene outside a window of the vehicle 101 are visible to the user 202 in FIG. 10 in a case where the vehicle 101 is stopped.

In the above example, a hotel having a pyramid-shaped building and a monument resembling a sphinx is set as a target object 211. Further, a contour 221, that is, a display item indicating the location of the target object 211 in the scene, is displayed along the perimeter of the target object 211 in order to highlight the target object 211. A character string 222 indicating the name of the target object 211 is displayed above the target object 211.

It should be noted that the actual name of the hotel is displayed in the "Hotel GHI" part of the character string in FIG. 11. The same holds true for the subsequent drawings.

Further, an image 223 of the Pyramid of Khufu being present in a space different from the scene visible from the window of the vehicle 101 is displayed to the right rear of the target object 211. The image 223 is displayed in order to compare, for example, the size and shape of the hotel, which is the target object 211, with those of the Pyramid of Khufu. Moreover, a contour 224 is displayed along the perimeter of the image 223 to highlight the image 223. A character string 225 indicating the name of the pyramid depicted by the image 223 is displayed above the image 223.

As described above, in a case where the vehicle 101 is stopped, the target object 211 is present near the vehicle 101, and only one user 202 acts as the target user, the content visible to the user 202 is displayed in such a manner as to exactly superimpose the content on the target object 211. This increases content visibility to the user 202.

FIGS. 12 to 15 illustrate examples where content is displayed while the vehicle 101 is running at a low speed in a case where an extracted target object 211 is similar to the target object depicted in FIG. 11.

Figure 12:
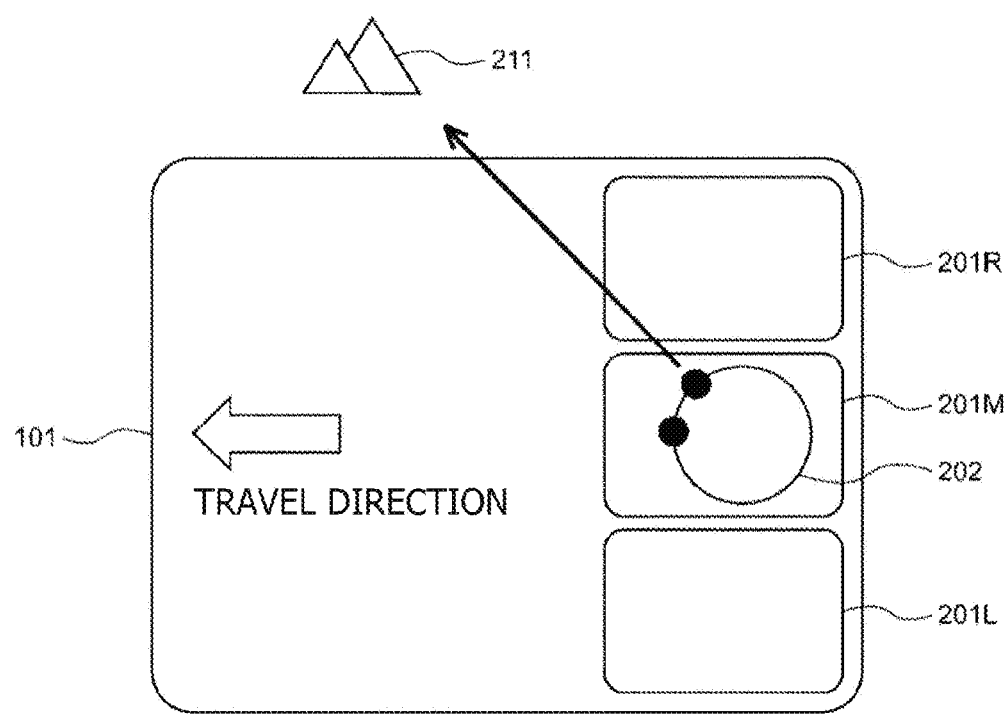
FIG. 12 is a diagram illustrating an example of a positional relation between a target user and a target object.
Figure 13:
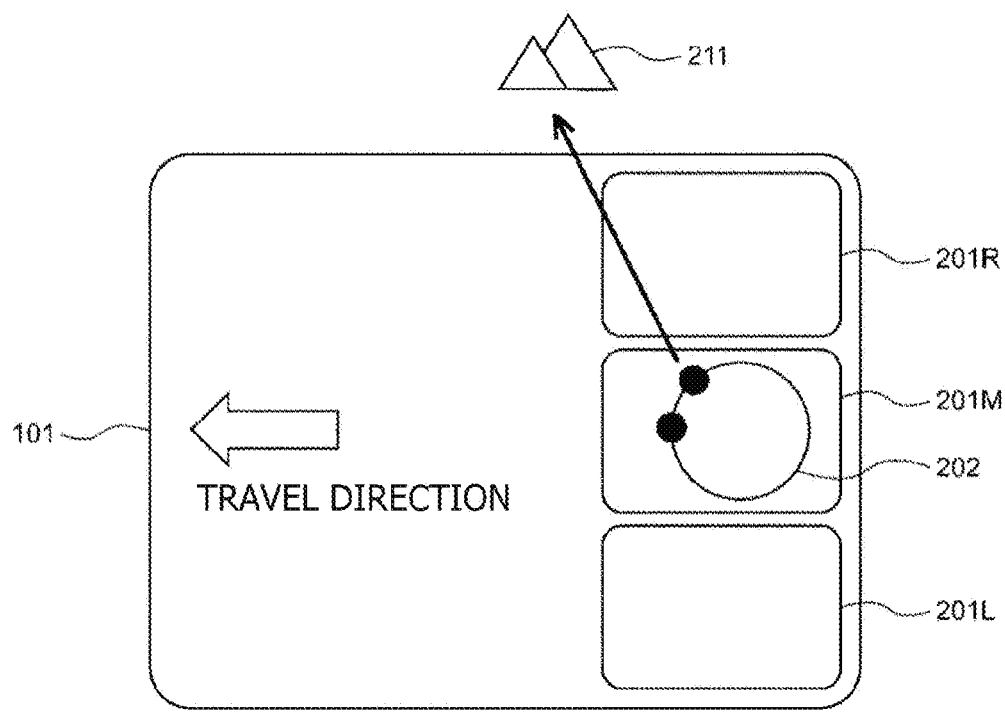
FIG. 13 is a diagram illustrating an example of a positional relation between a target user and a target object.
Figure 14:
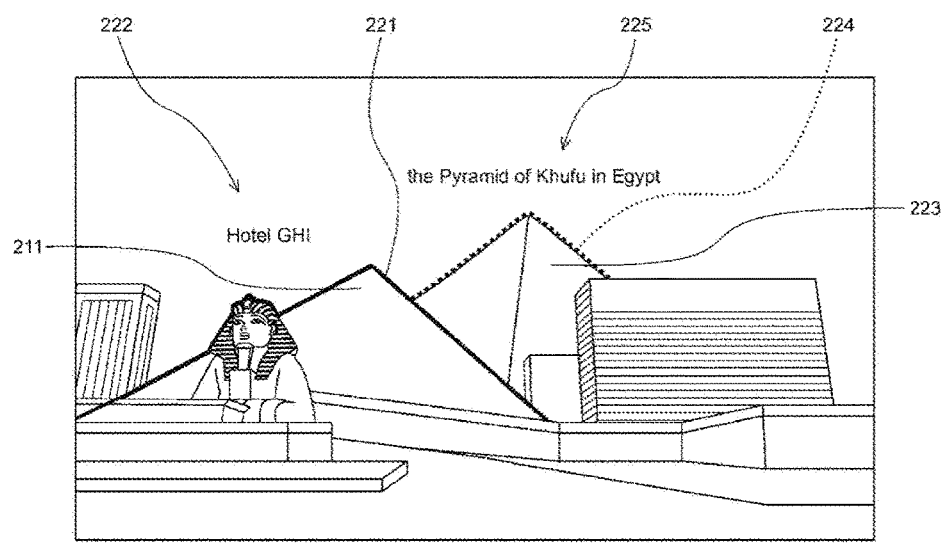
FIG. 14 is a diagram illustrating an example of content display.
Figure 15:
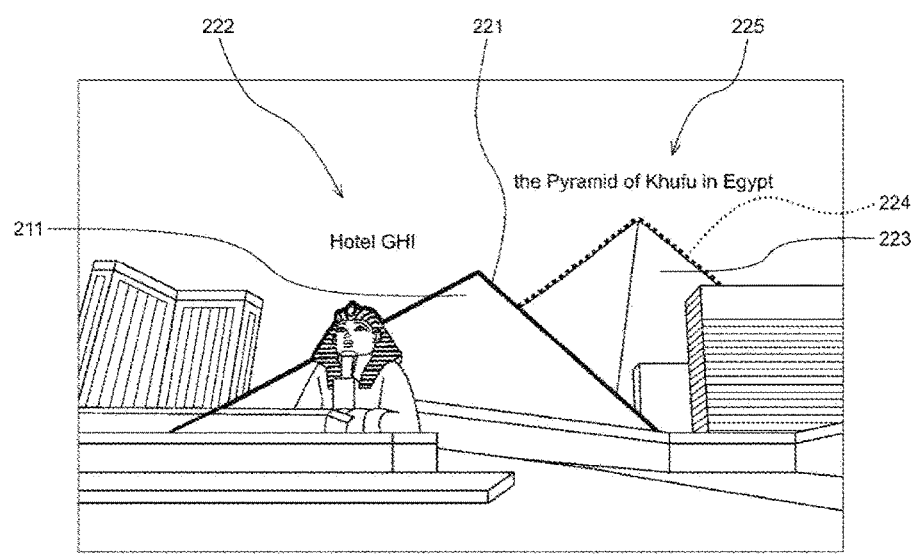
FIG. 15 is a diagram illustrating an example of content display.

In a case where the vehicle 101 is running at a low speed, the location of a scene visible to the user 202 from a window of the vehicle 101 changes and the location of the target object 211 changes with respect to the user 202, as depicted in FIGS. 12 and 13. Accordingly, as depicted in FIGS. 14 and 15, the position of the displayed content moves until the displayed content is exactly superimposed on the target object 211 as viewed from the user 202.

At this time, the displayed content slowly moves because the vehicle 101 is running at the low speed. This increases the length of time during which the content is displayed. Consequently, the user 202 is able to certainly confirm the content.

Returning to FIG. 9, in a case where it is determined in step S7 that the speed of the vehicle 101 is equal to or higher than the predetermined threshold, the content control section 41 determines that the vehicle speed is equal to or higher than the predetermined speed, and processing proceeds to step S9.

Meanwhile, in a case where it is determined in step S6 that the number of target users is two or more, processing also proceeds to step S9.

Figure 16:
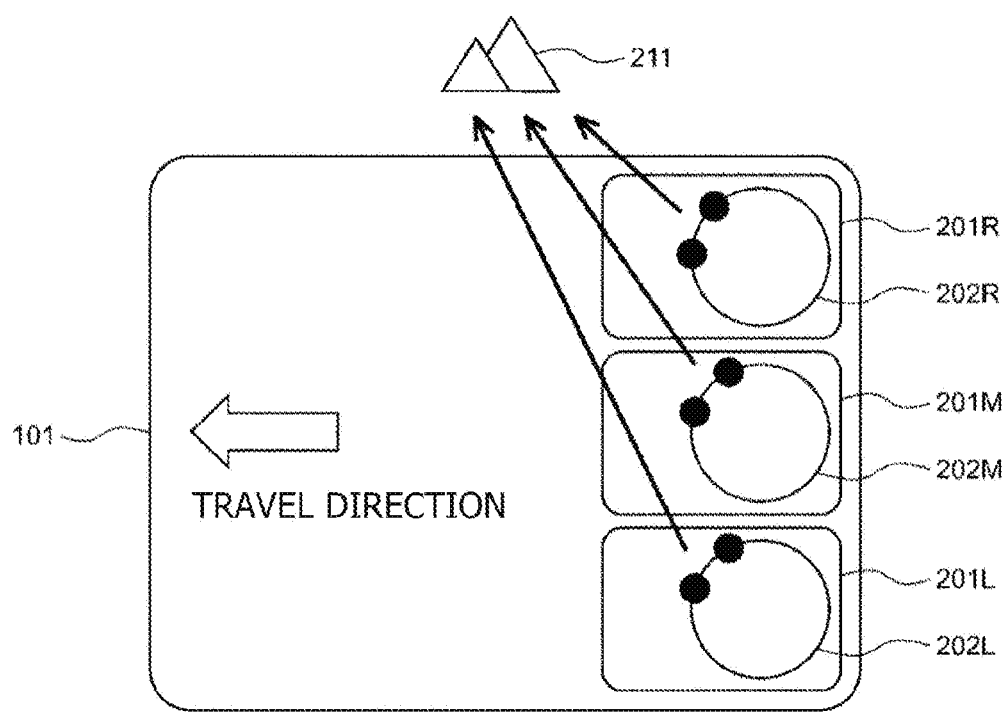
FIG. 16 is a diagram illustrating an example of a positional relation between a target user and a target object.

For example, in a case where, as depicted in FIG. 16, the three users 202L to 202R are sitting on the back seats 201L to 201R of the vehicle 101 and the content is displayed on a window to the right of the back seats, it is determined that the number of target users is two or more, and processing proceeds to step S9.

In step S9, the information processing system 1 performs a pasting process.

For example, in a case where two or more target users are present, it is difficult to exactly superimpose the content viewed by all the target users on a target object because the line-of-sight direction with respect to the target object varies from one target user to another. Further, in a case where the vehicle speed is equal to or higher than the predetermined speed, executing the exact superimposition process increases the speed at which the content moves, and thus makes it difficult for the target users to visually recognize the content.

Accordingly, according to, for example, the content display data acquired, from the server outside the vehicle, the database in the vehicle, or the like, the content control section 41 sets the description and display position of the content, independently of a scene visible from a window of the vehicle 101.

The image processing section 42 generates the content image data that displays the content whose description is set by the content control section 41 at the display position set by the content control section 41.

The output control section 43 supplies the content image data, which is generated by the image processing section 42, to the display section 13.

The display section 13 displays the content according to the content image data. As a result, within the target user's field of view, the content is superimposed on the scene outside the window.

Subsequently, processing returns to step S1 and executes steps S1 and beyond.

An example of the pasting process will now be described with reference to FIGS. 17 and 18.

First, the description given below with reference to FIG. 17 deals with an example of the pasting process that is performed in a case where the number of target users is one and the vehicle speed is equal to or higher than the predetermined speed.

In this case, first, the exact superimposition process is executed in the manner described above with reference to FIGS. 11, 14, and 15. Then, the content moves according to the movement of the vehicle 101 in such a manner that the content viewed by the user 202 is exactly superimposed on the target object 211.

However, since the vehicle 101 is moving at a high speed, the target object 211 soon disappears from the window of the vehicle 101.

Figure 17:
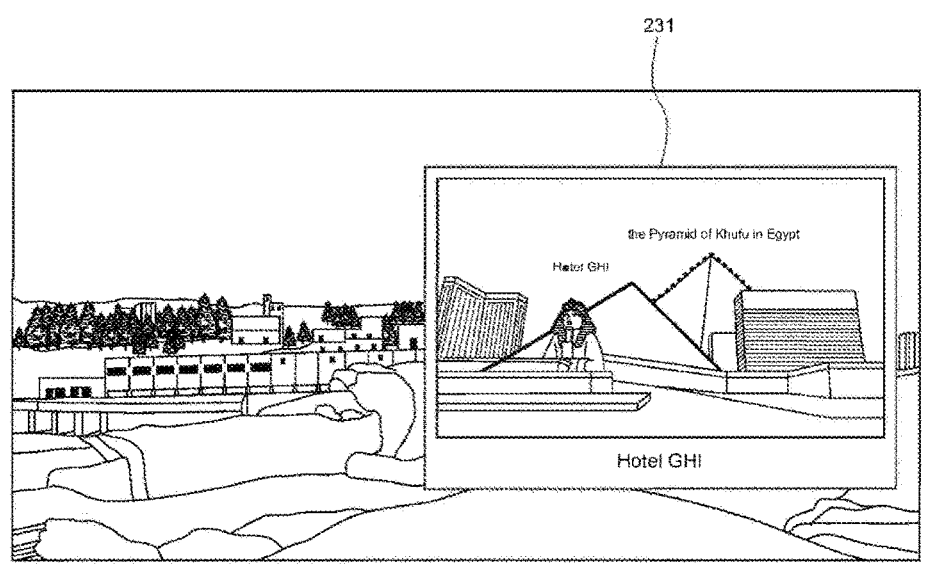
FIG. 17 is a diagram illustrating an example of content display.

Meanwhile, for a predetermined period of time, for example, after the disappearance of the target object 211 from the window of the vehicle 101, a display screen 231 remains displayed as depicted in FIG. 17, independently of the scene visible from the window of the vehicle 101. The display screen 231 depicts an image that is obtained, for example, by reproducing the scene on which the content depicted in FIG. 11 is superimposed. This image is generated by superimposing the content on an image captured, for example, by the RGB camera 102-3R. Further, the name of the hotel is displayed below the image in the display screen 231. The display screen 231 remains displayed in a fixed position on the window of the vehicle 101 without regard to the movement of the vehicle 101.

Consequently, the target user is able to confirm information regarding the target object 211 even after the vehicle 101 has passed the neighborhood of the target object 211.

Now, the description given below with reference to FIG. 18 deals with an example of the pasting process that is performed in a case where the target object is present nearby and the number of target users is two or more.

Figure 18:
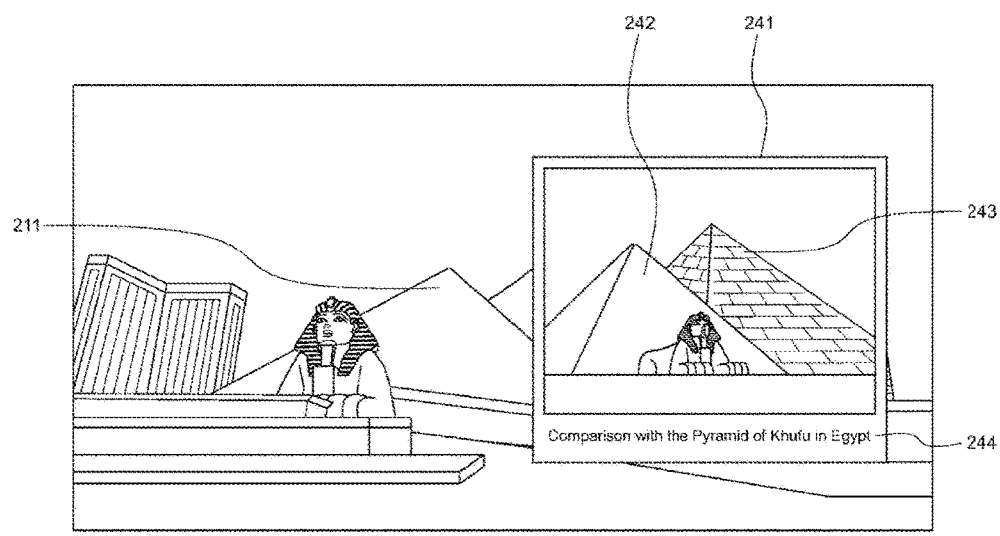
FIG. 18 is a diagram illustrating an example of content display.

FIG. 18 illustrates an example of content that is displayed by the pasting process in the above case.

In the example of FIG. 18, a display screen 241 is displayed independently of a scene visible from a window of the vehicle 101. Displayed in the display screen 241 are an image 242 of the target object 211 and an image 243 of the pyramid. The image 243 is displayed to the right rear of the image 242. This enables the target users to compare, for example, the size and shape of the hotel, which is the target object 211, with those of the Pyramid of Khufu. Further, an explanation 244 regarding the information in the display screen 241 is displayed at the lower end of the display screen 241.

The display screen 241 is displayed in a fixed position on the window of the vehicle 101 without regard to the movement of the vehicle 101. Further, the display screen 241 remains displayed for a predetermined period of time even after the disappearance of the target object 211 from the window of the vehicle 101.

Consequently, the target users are able to carefully confirm the content. Further, the content can be confirmed simultaneously by a plurality of target users.

Meanwhile, returning to FIG. 9, in a case where it is determined in step S5 that the distance between the vehicle 101 and the target object is longer than the first predetermined threshold, the content control section 41 determines that the target object is not present nearby, and processing proceeds to step S10.

In step S10, the content control section 41 determines whether or not the target object is present far away. In a case where the distance between the vehicle 101 and the target object is shorter than a second predetermined threshold, the content control section 41 determines that the target object is not present far away, and processing proceeds to step S11. This is the case where the distance between the vehicle 101 and the target object is longer than the first threshold and shorter than the second threshold, that is, a medium distance.

In step S11, the information processing system 1 performs a medium-distance display process. More specifically, the content control section 41 sets the description and display position of the content according to, for example, the location of the target object, the number, positions, at least either the lines of sight or face orientations of target users, and the content display data acquired from the server outside the vehicle, the database in the vehicle, or the like.

The image processing section 42 generates the content image data that displays the content whose description is set by the content control section 41 at the display position set by the content control section 41.

The output control section 43 supplies the content image data, which is generated by the image processing section 42, to the display section 13.

The display section 13 displays the content according to the content image data. As a result, within the target user's field of view, the content is superimposed on the scene outside the window.

Subsequently, processing returns to step S1 and executes steps S1 and beyond.

Referring now to FIGS. 19, 20A, 20B, 20C, 21, 22A, 22B, 23A, 23B, 24, 25A, 25B, and 26, specific examples of the medium-distance display process will be described.

For example, in a case where the distance to the target object is equal to or longer than the medium distance, the target object looks small when viewed from the target user. Therefore, if the above-described exact superimposition process is executed in this case, the displayed content looks small. This makes it difficult for the target user to confirm the content.

In the above situation, the content control section 41 narrows down the description of the content to enlarge the displayed content. For example, the content control section 41 narrows down the description of the content to only the name of the target object.

Figure 19:
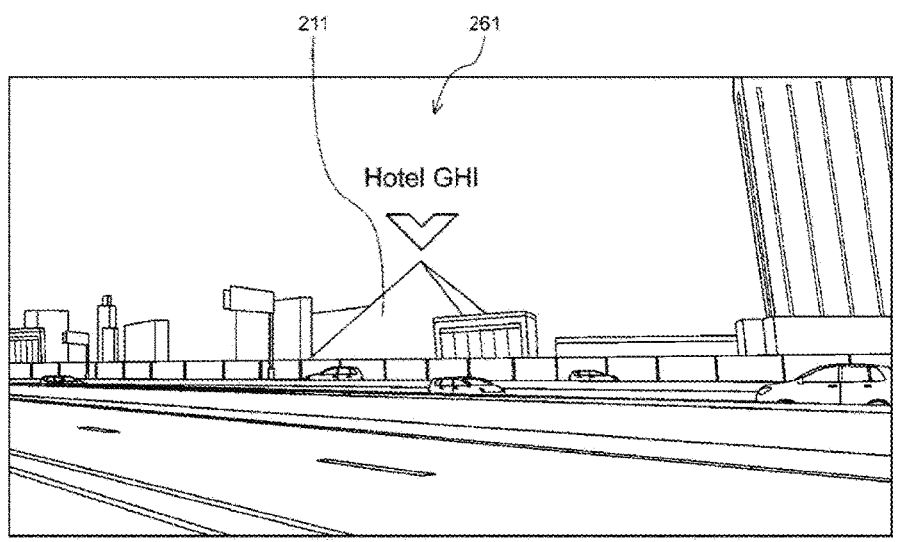
FIG. 19 is a diagram illustrating an example of content display.

FIG. 19 illustrates an example of content displayed in a case where the target object 211 is a hotel similar to the hotel depicted in the earlier-described example and the distance to the target object 211 is the medium distance. In this example, the name of the target object 211 and content 261 including an arrow are displayed. The arrow is a display item indicating the location of the target object 211 in the scene.

Here, in a case where the number of target users is two, a positional relation between the target object 211 and the content 261 varies from one target user to another.

Figure 20A:
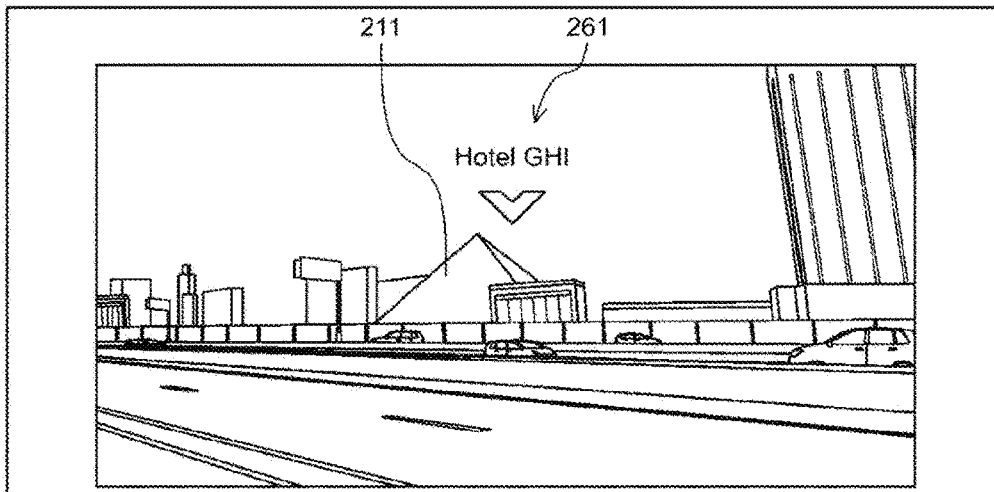
FIGS. 20A, 20B, and 20C depict diagrams illustrating an example in which a location where content is visible varies with the position of a target user.
Figure 20B:
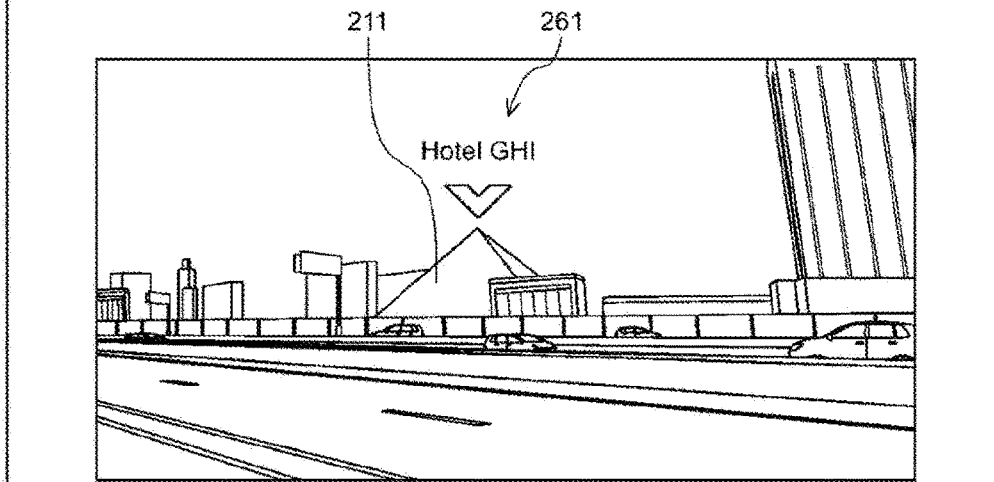
Figure 20C:
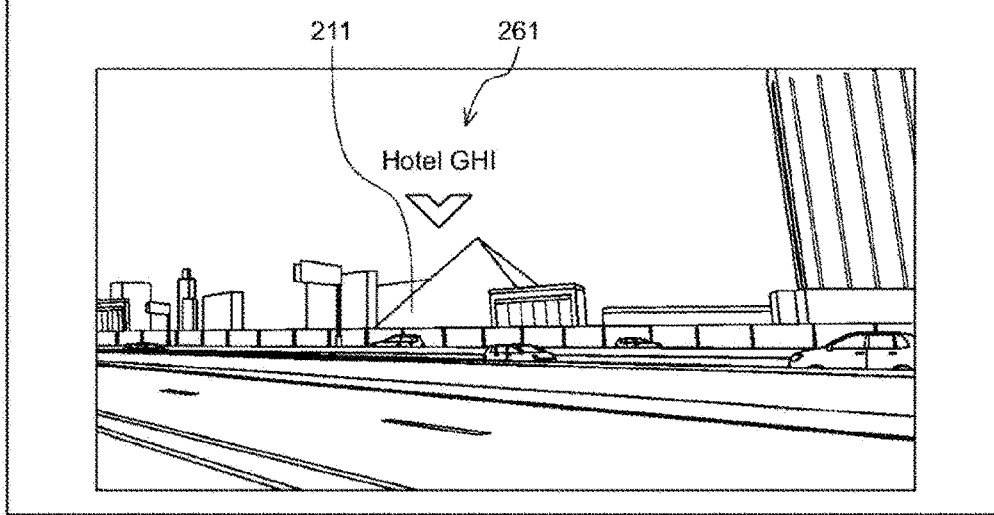

For example, FIGS. 20A, 20B, and 20C illustrate an example of the positional relation between the target object 211 and the content 261 as viewed from each user in a case where the users 202L to 202R are sitting on the seats 201L to 201R of the vehicle 101 as depicted earlier in FIG. 16.

More specifically, FIG. 20A depicts an example of the positional relation between the target object 211 and the content 261 as viewed from the user 202R. In this example, the content 261 is displaced to the right from the target object 211.

FIG. 20B depicts an example of the positional relation between the target object 211 and the content 261 as viewed from the user 202M. In this example, the content 261 is displayed directly above the target object 211.

FIG. 20C depicts an example of the positional relation between the target object 211 and the content 261 as viewed from the user 202L. In this example, the content 261 is displaced to the left from the target object 211.

As described above, in a case where the content 261 is displayed above the target object 211, the content 261 may look displaced horizontally from the target object 211 depending on the position of the target user.

Figure 21:
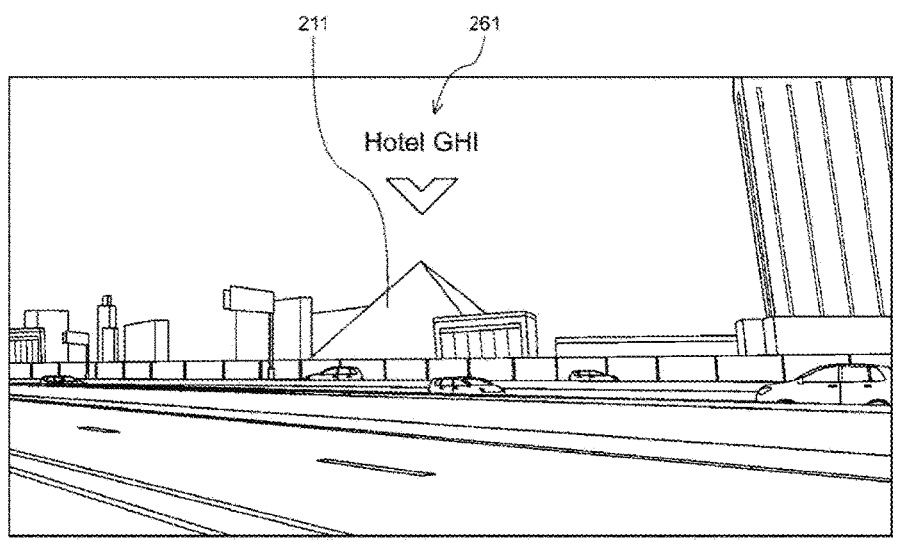
FIG. 21 is a diagram illustrating an example of content display.

In the above situation, the content control section 41 increases the distance between the target object 211 and the content 261 as depicted, for example, in FIG. 21. In the example of FIG. 21, the position of the content 261 is shifted upward from the target object 211 when compared with the example of FIG. 19.

Consequently, the horizontal displacement between the target object 211 and the content 261 becomes inconspicuous when viewed from each target user.

Figure 22A:
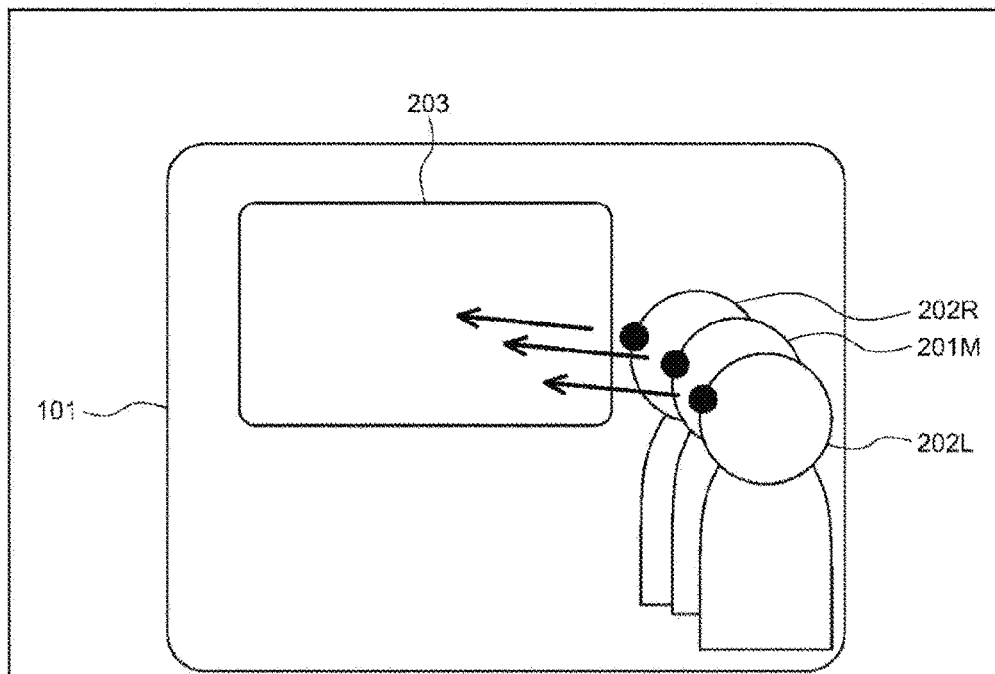

It should be noted that the content control section 41 may provide finer control of a content display position according to the positional relation between the target users. For example, the content control section 41 may change the content display position depending on whether the target users are lined up horizontally as depicted in FIGS. 22A and 22B or lined up vertically as depicted in FIGS. 23A and 23B.

Figure 22B:
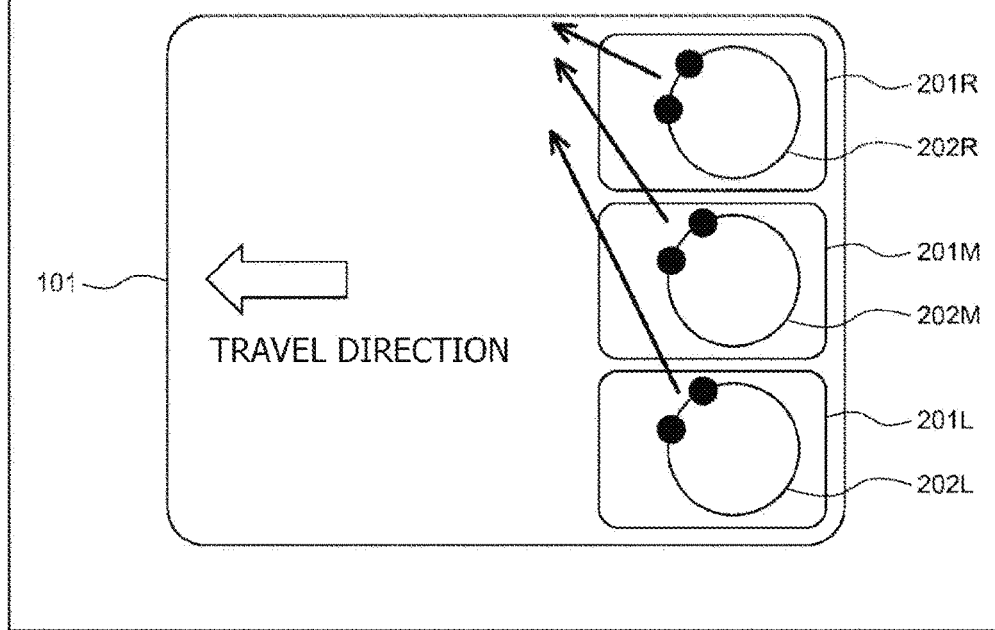
Figure 23A:
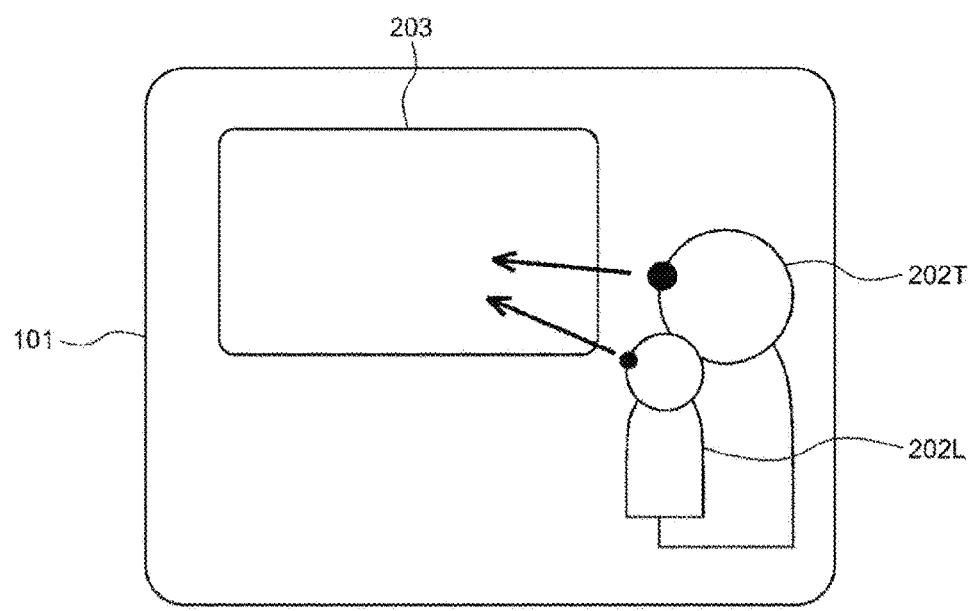
FIGS. 23A and 23B depict diagrams illustrating an example of a positional relation between a target object and a plurality of target users lined up vertically.
Figure 23B:
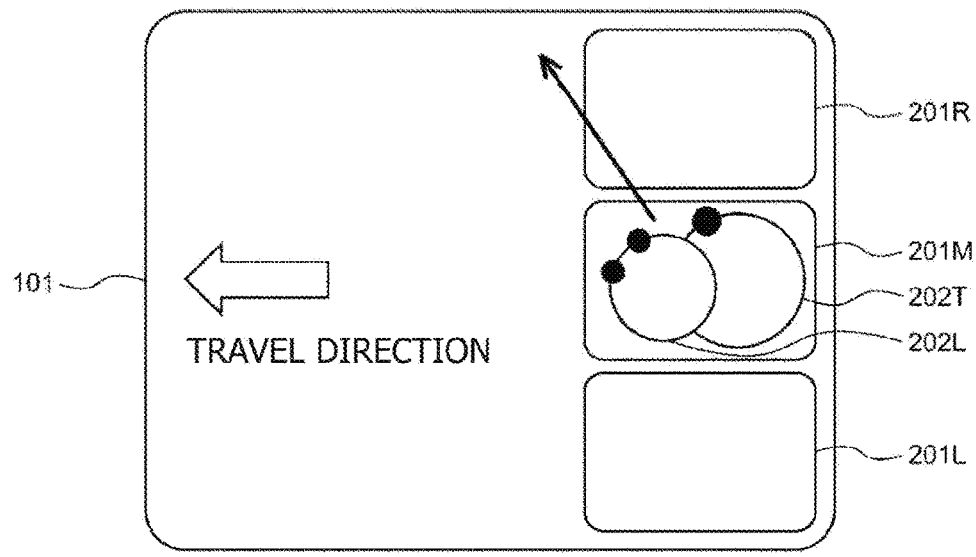

FIG. 22B depicts an example where the users 202L to 202R are sitting on the seats 201L to 201R of the vehicle 101, as is the case with the example of FIG. 19. In the case depicted in FIG. 22B, the eyes of the users 202L to 202R are positioned in a substantially horizontal arrangement as depicted in FIG. 22A. Further, in a case where the content 261 is displayed above the target object 211, the content 261 may look displaced horizontally from the target object 211, depending on the user as described earlier with reference to FIGS. 20A, 20B, and 20C.

Figure 24:
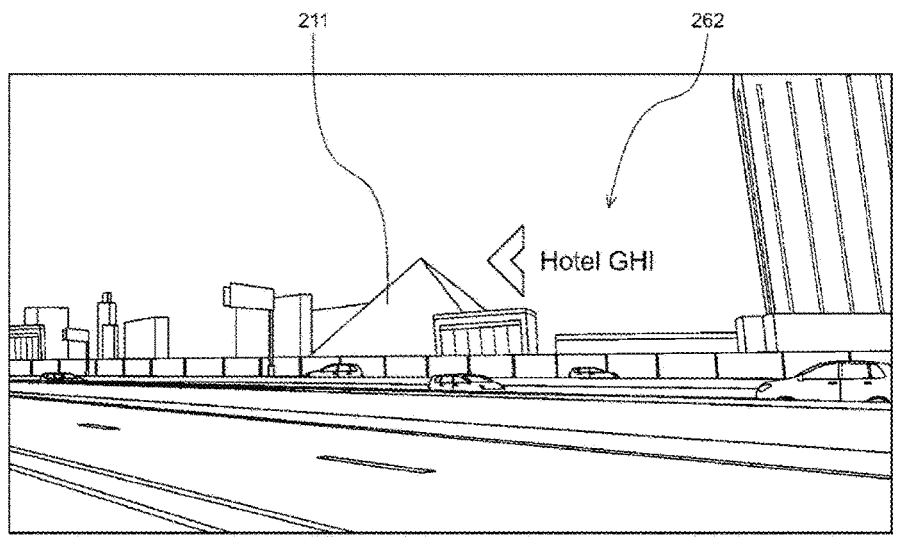
FIG. 24 is a diagram illustrating an example of content display.

In the above situation, the content control section 41 sets the display position of content 262 to the right of the target object 211 as depicted, for example, in FIG. 24. The content 262 includes the name of the target object 211 and an arrow used as a display item indicating the location of the target object 211 in the scene.

It should be noted that the display position of the content 262 may be set, for example, to the left of the target object 211.

Disposing the content 262 in a horizontal direction from the target object 211 as described above absorbs the difference between the positions of the target users lined up horizontally. That is, the content 262 is displayed at a position where the individual target users who are lined up horizontally and viewing the content 262 do not feel uncomfortable.

Meanwhile, in the example depicted in FIG. 23B, users 202T and 202L are sitting on the same seat 201M. As depicted in FIG. 23A, the user 202T has a greater sitting height than the user 202L. In this case, it is conceivable, for example, that the user 202T may be a parent of the user 202L.

In the above case, the users 202T and 202L differ in eye height. Therefore, in a case where the content 262 is displayed to the right of the target object 211 as depicted in the above-mentioned FIG. 24, the content 262 is visible in a manner that varies from one user to another as depicted in FIGS. 25A and 25B.

Figure 25A:
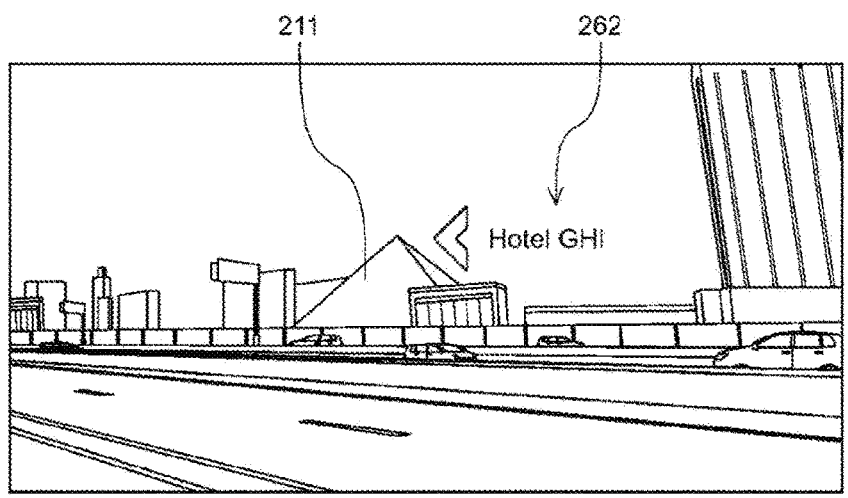
FIGS. 25A and 25B depict diagrams illustrating an example in which a location where content is visible varies with a height of eyes of a target user.
Figure 25B:
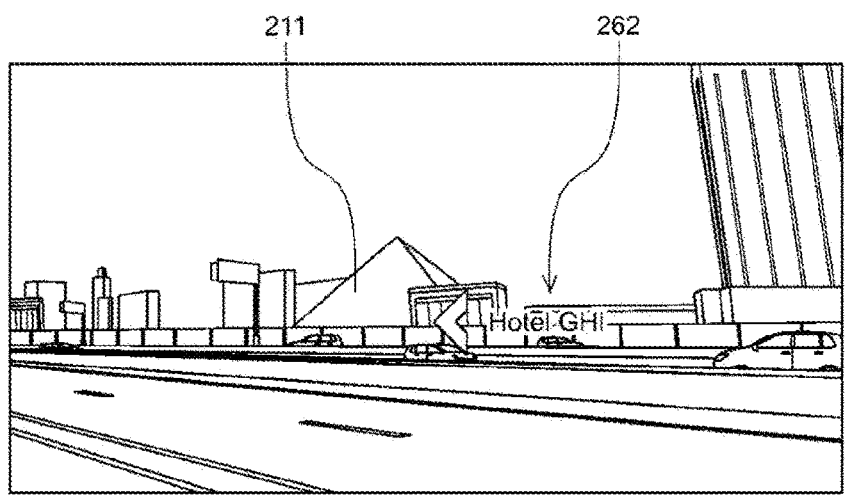

More specifically, FIG. 25A illustrates an example depicting how the content 262 is viewed by the user 202T. In this example, the content 262 is displayed at substantially the same height as the target object 211. FIG. 25B illustrates an example depicting how the content 262 is viewed by the user 202L. In this example, the content 262 is displaced downward from the target object 211. As described above, in the case where the target users differ in eye height, the content 261 may look displaced vertically from the target object 211 depending on the target user.

Figure 26:
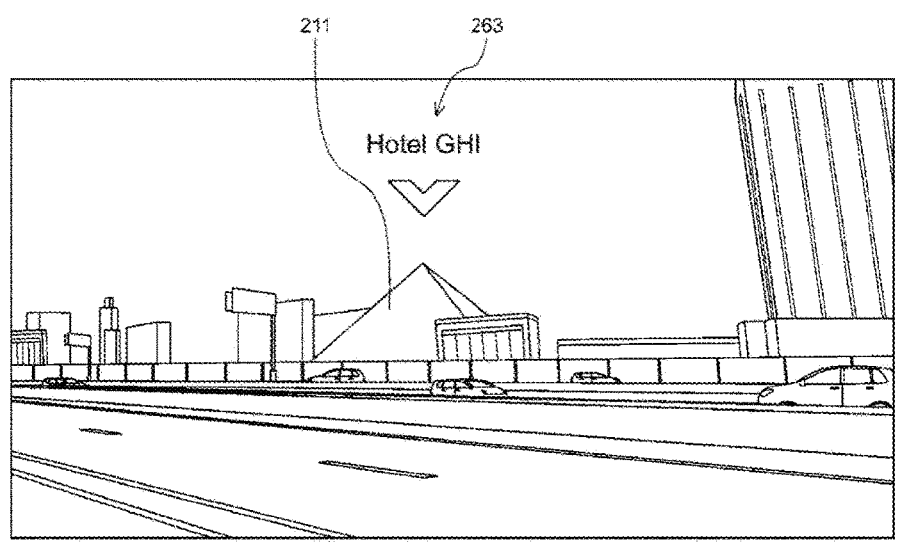
FIG. 26 is a diagram illustrating an example of content display.

In the above situation, the content control section 41 sets the display position of content 263 to a position above the target object 211 as depicted, for example, in FIG. 26. The content 263 includes the name of the target object 211 and an arrow used as a display item indicating the location of the target object 211 in the scene.

It should be noted that the display position of the content 263 may be set, for example, to a position below the target object 211.

Disposing the content 263 in a vertical direction from the target object 211 as described above absorbs the difference in eye height between the target users. That is, the content 263 is displayed at a position where the individual target users who are lined up vertically and viewing the content 263 do not feel uncomfortable.

Meanwhile, returning to FIG. 9, in a case where it is determined in step S10 that the distance between the vehicle 101 and the target object is equal to or longer than the second predetermined threshold, the content control section 41 determines that the target object is present nearby, and processing proceeds to step S12.

In step S12, the information processing system 1 executes a long-distance display process. More specifically, the content control section 41 sets the description and display position of the content according to, for example, the location of the target object and the content display data acquired from the server outside the vehicle, the database in the vehicle, or the like.

The image processing section 42 generates the content image data that displays the content whose description is set by the content control section 41 at the display position set by the content control section 41.

The output control section 43 supplies the content image data, which is generated by the image processing section 42, to the display section 13.

The display section 13 displays the content according to the content image data. As a result, within the target user's field of view, the content is superimposed on the scene outside the window.

Subsequently, processing returns to step S1 and executes steps S1 and beyond.

Figure 27:
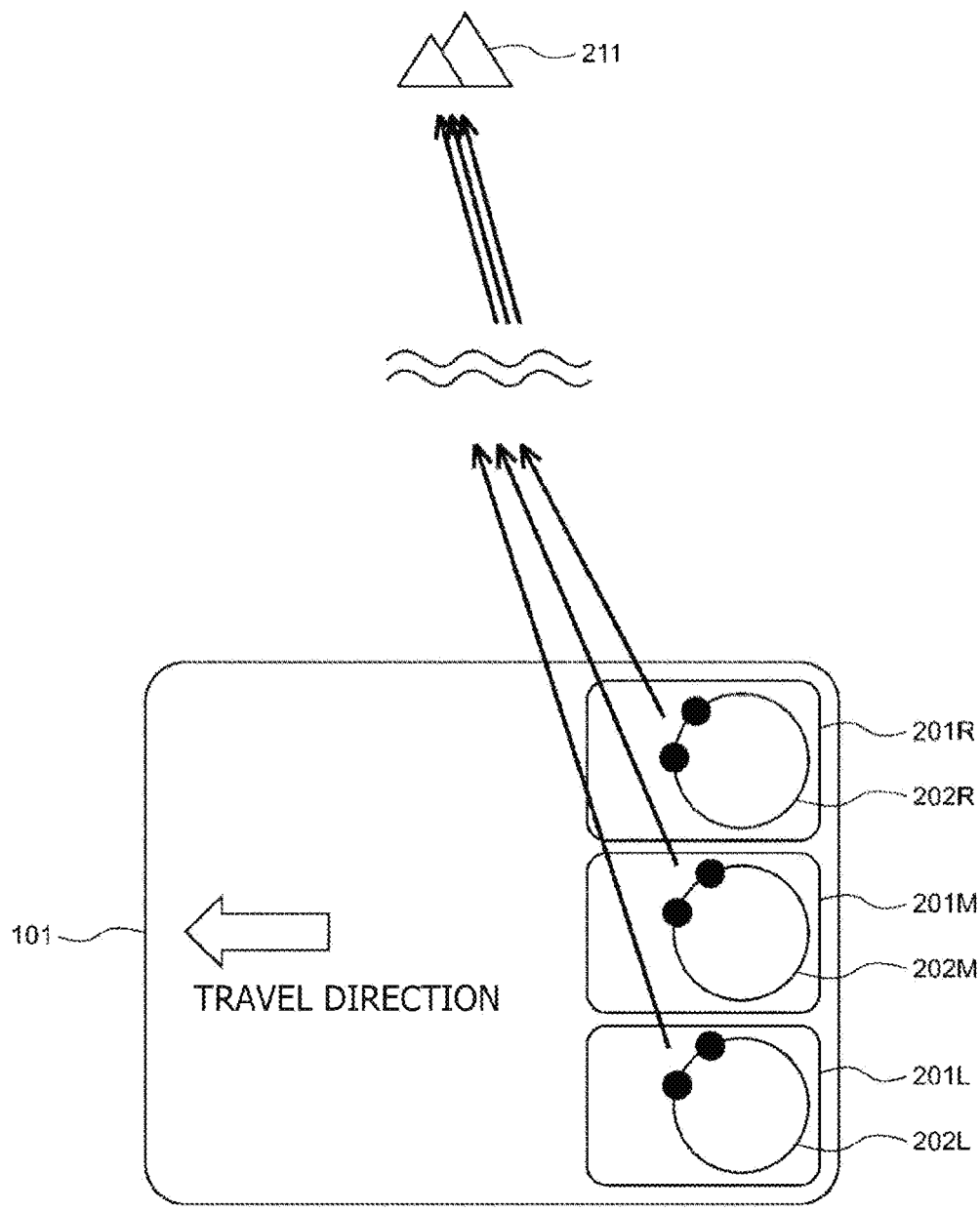
FIG. 27 is a diagram illustrating an example of a positional relation between target users and a target object.
Figure 28:
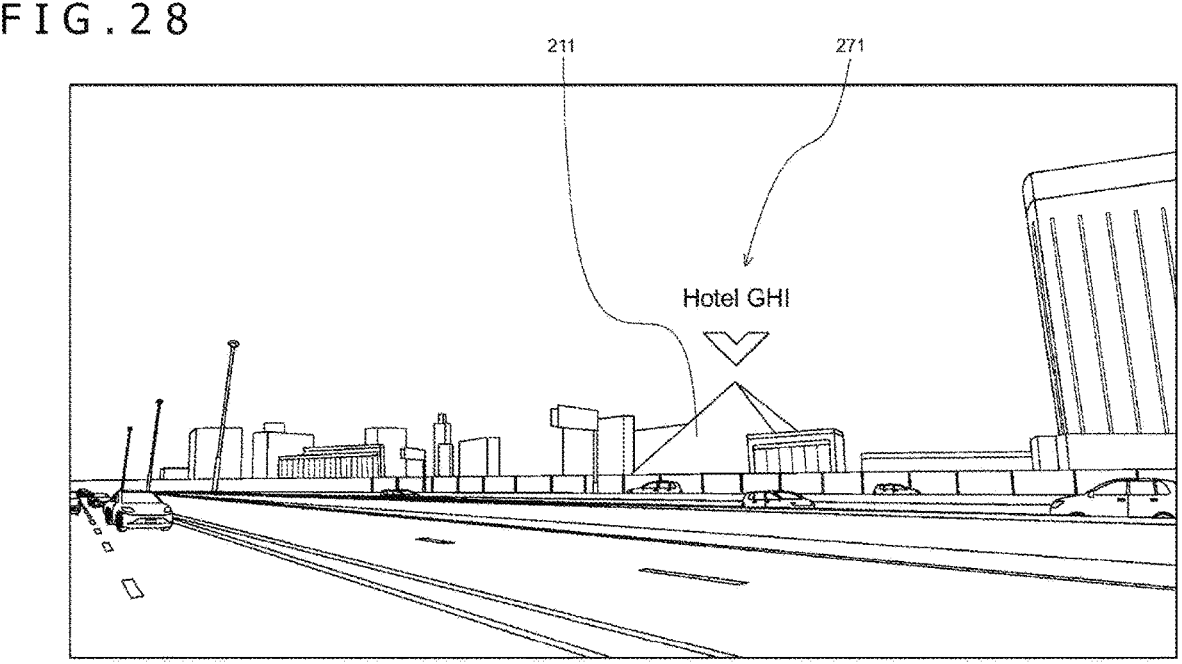
FIG. 28 is a diagram illustrating an example of content display.

Referring now to FIGS. 27 and 28, specific examples of the long-distance display process will be described.

In the example depicted in FIG. 27, the users 202L to 202R are sitting on the seats 201L to 201R of the vehicle 101. In a case where the target object 211 is present far away in the situation depicted in FIG. 27, the target object 211 is visible at substantially the same position without regard to the positions of the users.

Consequently, in the case where the target object 211 is present far away, the content control section 41 sets the display position of the content without considering the number and positions of target users. For example, the content control section 41 sets the display position of content 271 to a position directly above the target object 211 as depicted in FIG. 28.

In the above case, the display position of the content 271 can be changed to a position closer to the target object 211 as compared with the earlier-described example of FIG. 21. As described above, the content control section 41 may control the distance between the target object 211 and the content according to the distance between the vehicle 101 and the target object 211.

As described above, the description and display position of the content are appropriately set according to the distance between the vehicle 101 and the target object and with the number and positions of target users. As a result, the target users are able to certainly acquire the information regarding the target object.

Referring now to FIGS. 29A, 29B, 30A, 30B, 31A, and 31B, specific examples of content displayed by the exact superimposition process will be described.

Figures 29A, 29B:
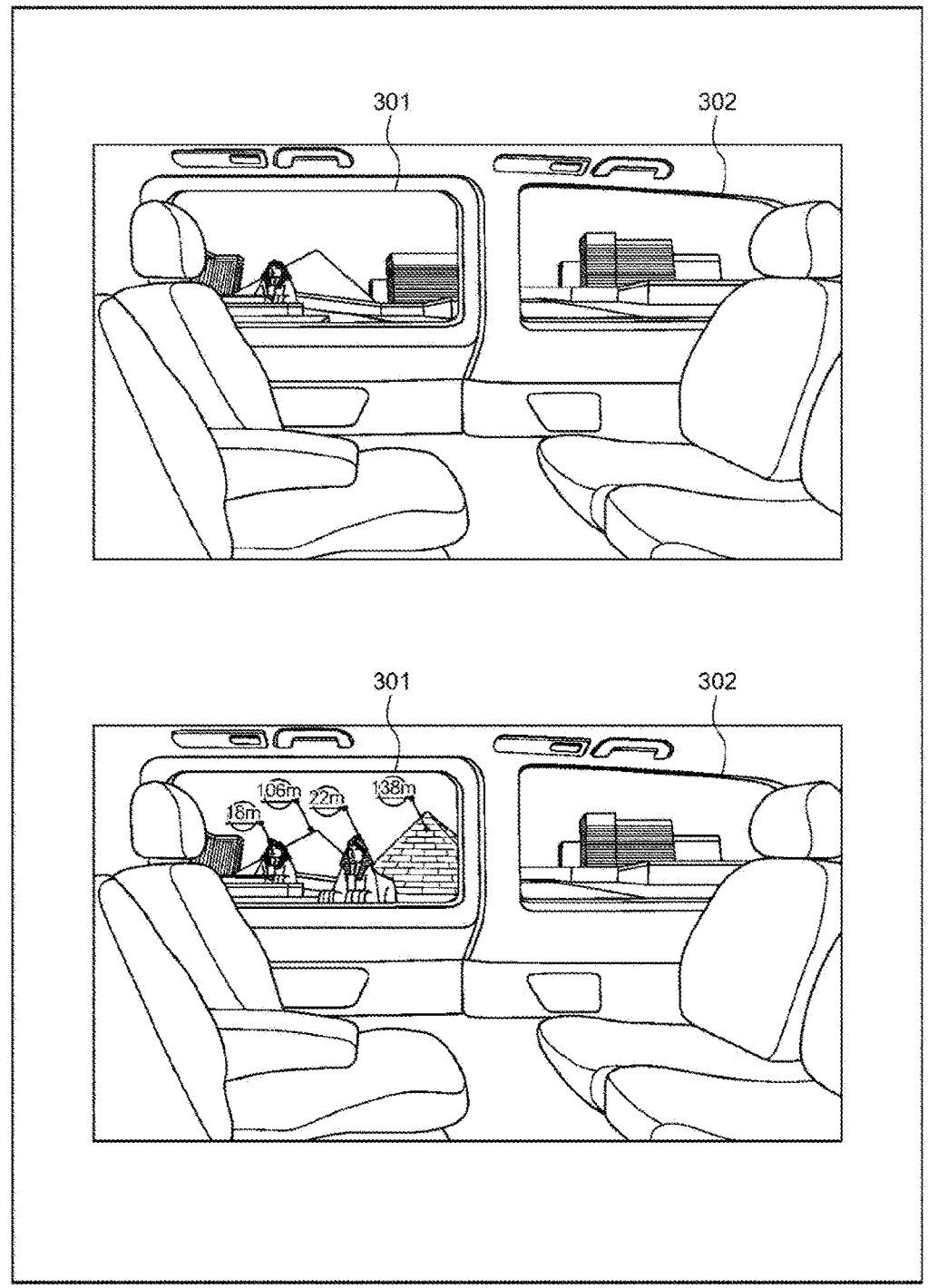
FIGS. 29A and 29B depict diagrams illustrating an example of content display.

FIG. 29A is a diagram schematically illustrating a scene that is visible from windows 301 and 302 before content display. FIG. 29B is a diagram schematically illustrating a scene that is visible from the windows 301 and 302 after content display.

In this example, a hotel having a pyramid-shaped building and a sphinx monument is set as the target object, as is the case with the earlier-described example. Further, as depicted in FIG. 29B, content indicating the height of the building and the monument is displayed. Further, for height comparison with the building and monument, content including the images of a pyramid and a sphinx and the height of the pyramid and the sphinx is displayed.

Figures 30A, 30B:
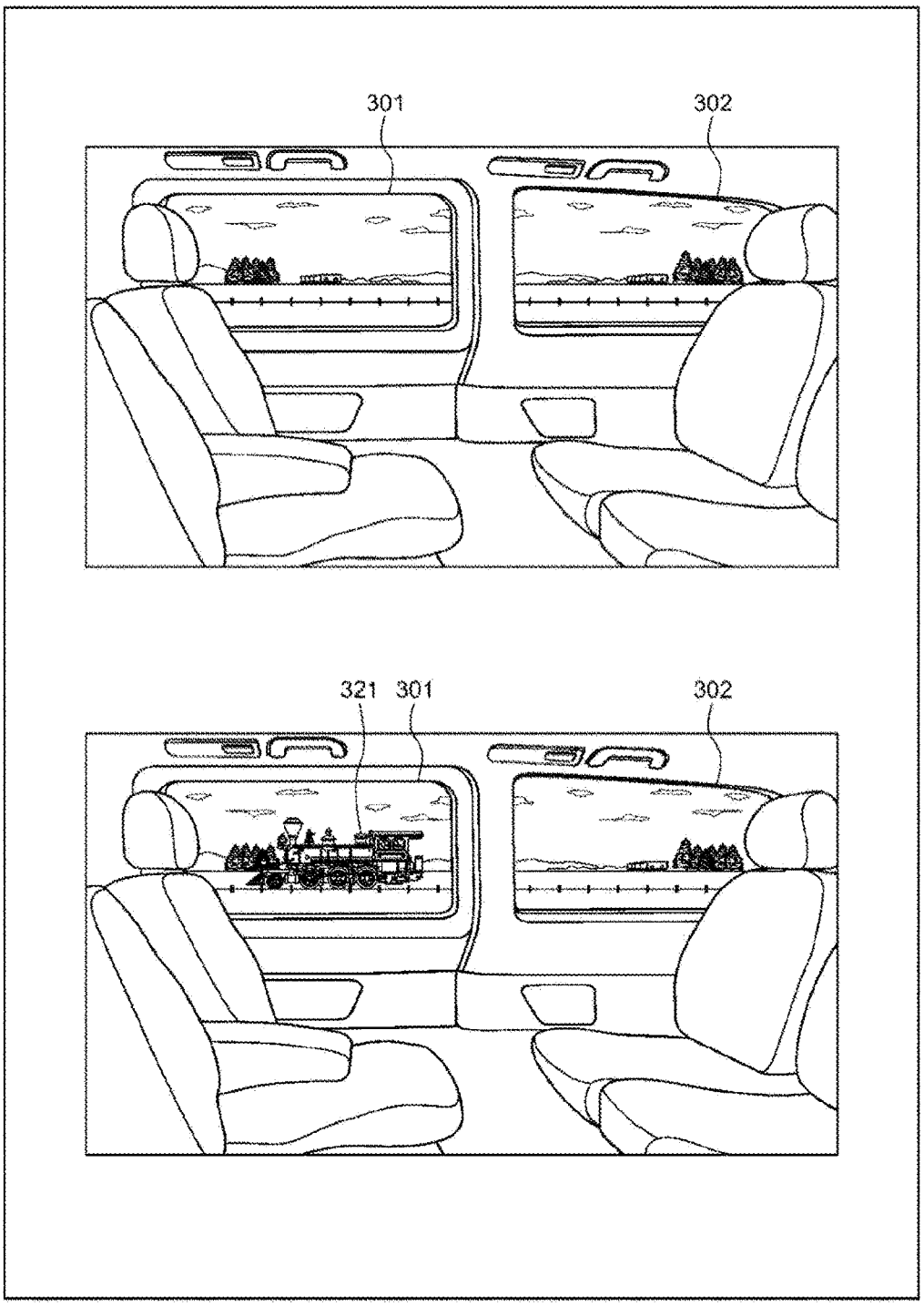
FIGS. 30A and 30B depict diagrams illustrating an example of content display.

FIG. 30A is a diagram schematically illustrating a scene that is visible from the windows 301 and 302 before content display. FIG. 30B is a diagram schematically illustrating a scene that is visible from the windows 301 and 302 after content display.

In this example, a track disused is visible from the windows 301 and 302. Further, as depicted in FIG. 30B, an image 321 of a locomotive running on the track in the past is displayed as the content indicating that the locomotive is exactly on the track.

It should be noted that the displayed content may include not only the information regarding the past of a scene visible from a window or an object in a scene, but also the information regarding the future. For example, although not specifically depicted in a drawing, an image of a building to be built in the future, or the like, may be displayed superimposed on the scene visible from the window.

Figure 31A:
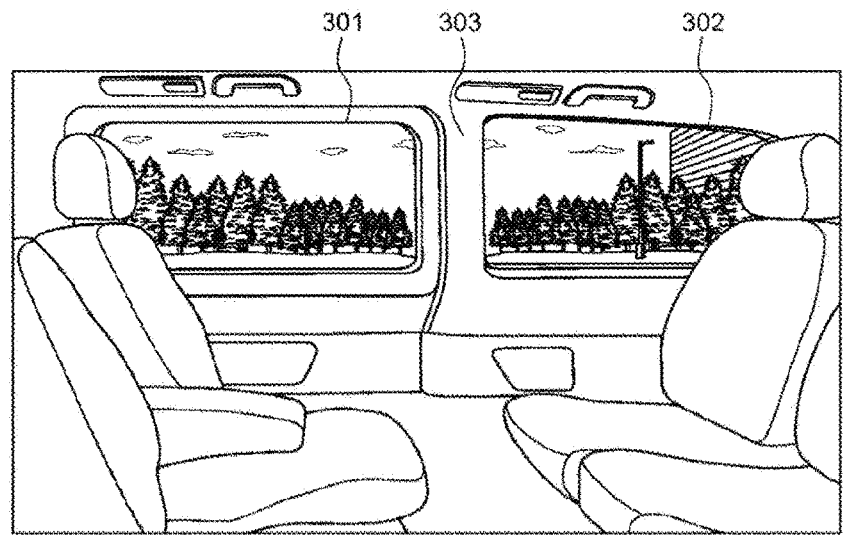
FIGS. 31A and 31B depict diagrams illustrating an example of content display.
Figure 31B:
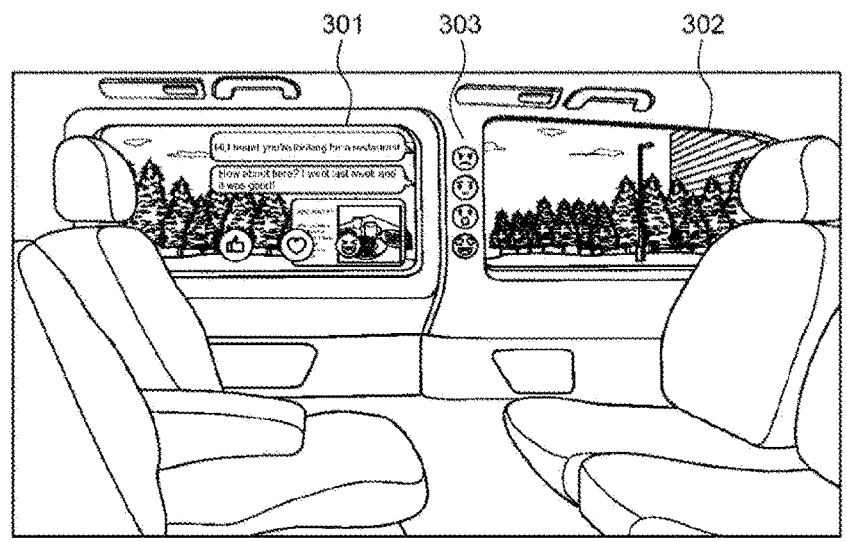

FIG. 31A is a diagram schematically illustrating a scene that is visible from the windows 301 and 302 before content display. FIG. 31B is a diagram schematically illustrating a scene that is visible from the windows 301 and 302 after content display.

In this example, a chat screen is displayed on the window 301. Further, a selection menu organized by arranging emoticons or other icons in an inverted L shape is displayed in an area extended from a pillar 303 between the windows 301 and 302 to the window 301. For example, by making a gesture of moving the icons displayed on the window 301 to the left or right, the users are able to scroll the icons displayed in the selection menu.

Examples of Display of Game Play Screen

Referring now to FIGS. 32 to 37, examples of the display of a game play screen will be described as the examples of content that the information processing system 1 displays by superimposing it on a scene visible from a window.

Figure 32:
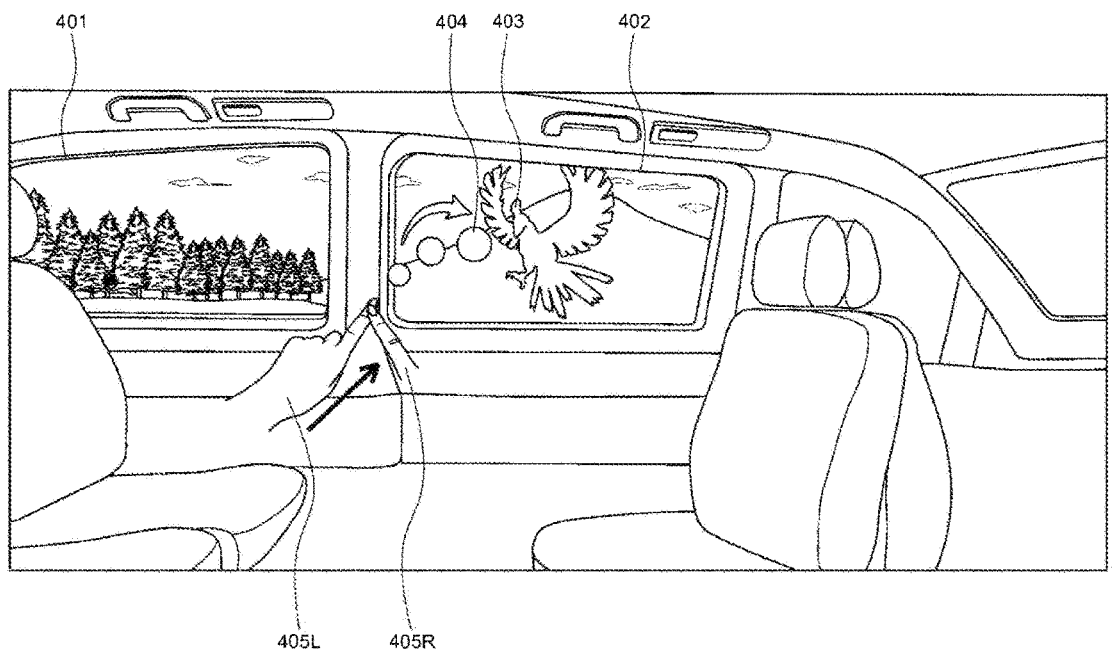
FIG. 32 is a diagram illustrating an example of the display of a game play screen.

In the example of FIG. 32, a bird-type character 403 for use in a game is displayed superimposed on a scene visible from a window 402 in a situation where windows 401 and 402 are available.

In the above situation, the user is able to play the game by making a predetermined gesture to operate the game play screen. For example, by making a gesture depicted in FIG. 33, the user is able to throw a ball 404 and allow the ball 404 to hit the character 403, as indicated by an arrow in FIG. 32.

Figure 33:
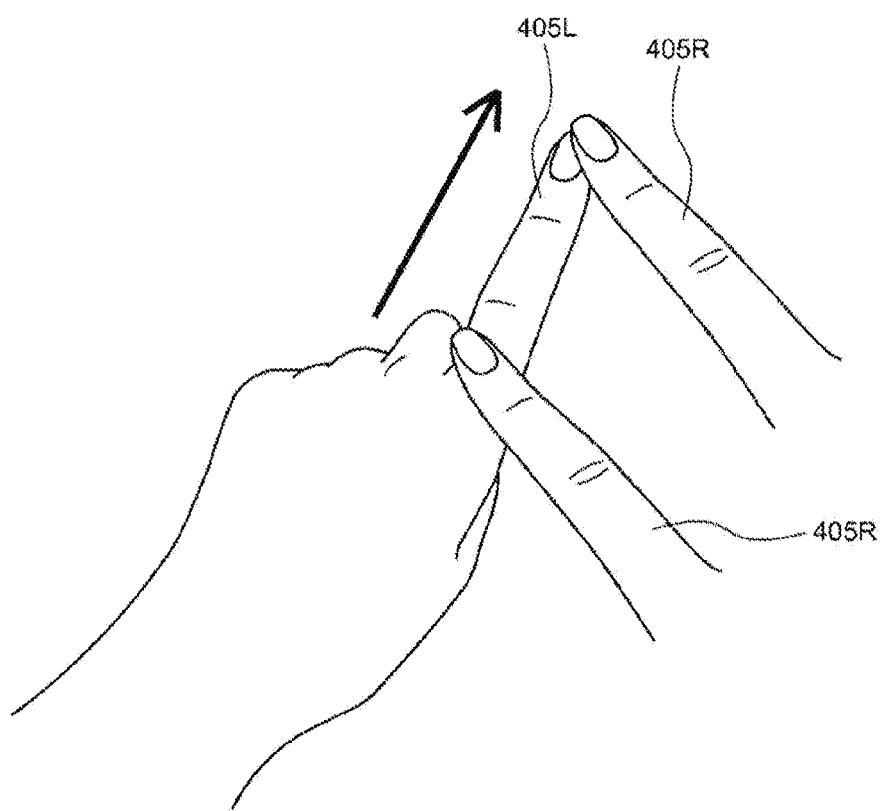
FIG. 33 is a diagram illustrating a game operating method.

More specifically, as depicted in FIG. 33, while the index finger of one hand (the index finger 405L of the left hand in this example) of the user is outstretched, the user slides the tip of the index finger of the other hand (the index finger 405R of the right hand in this example) forward over the index finger of the one hand.

In a case where the user state recognition section 32 accordingly recognizes the gesture depicted in FIG. 33, the display control section 23 controls the display of content in such a manner as to display a video image of the ball 404 flying in a direction indicated by the index finger of the one finger.

Figure 34:
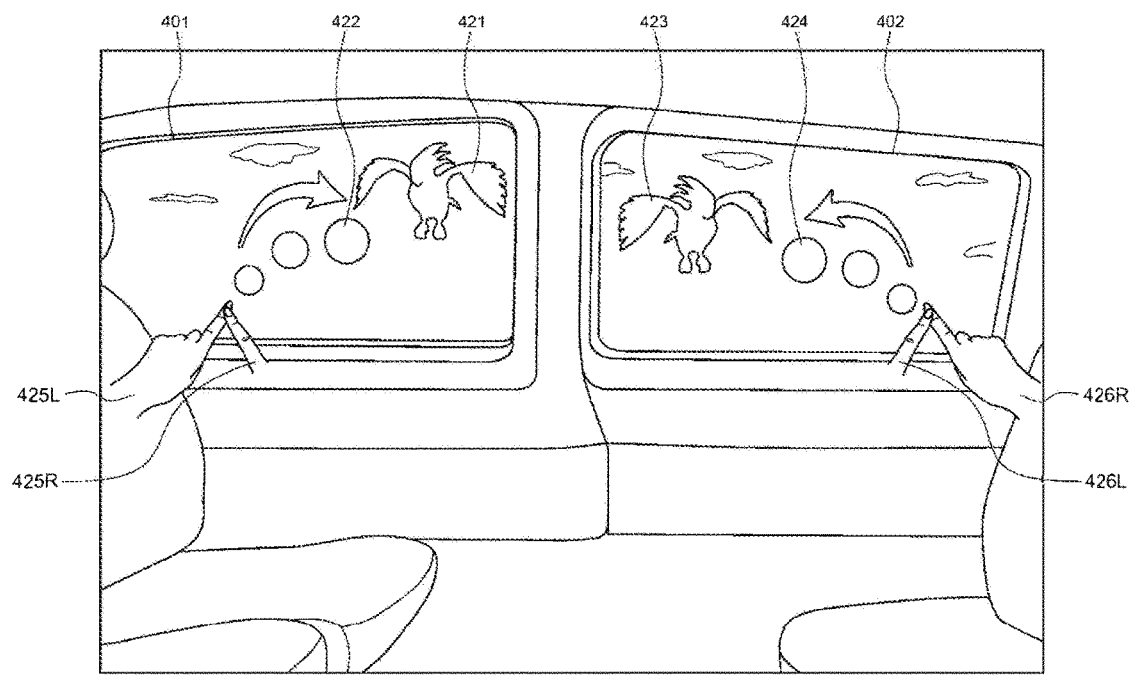
FIG. 34 is a diagram illustrating an example of the display of the game play screen.

FIG. 34 illustrates an example of content display in a case where two users are playing the game mentioned with reference to FIG. 32 by use of the windows 401 and 402, respectively.

In the above example, a character 421 is displayed on the window 401. Further, one of the two users is throwing a ball 422 toward the character 421 by making the gesture described with reference to FIG. 33 with the index finger 425L of the left hand and the index finger 425R of the right hand.

Meanwhile, a character 423 is displayed on the window 402. Further, the other user is throwing a ball 424 toward the character 423 by making the gesture described with reference to FIG. 33 with the index finger 426L of the left hand and the index finger 426R of the right hand.

As described above, different pieces of content (game play screens in the case of the above example) can be displayed on different windows for different users.

Figure 35:
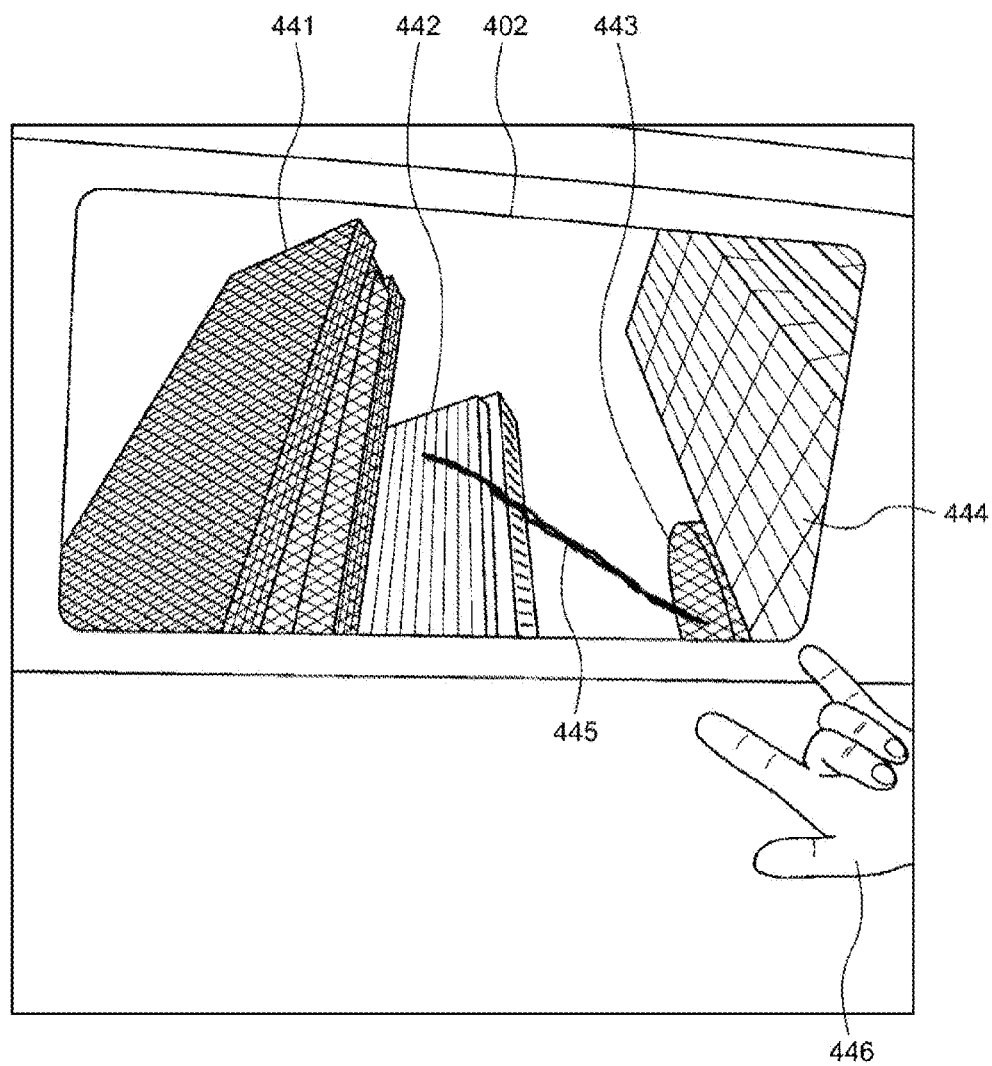
FIG. 35 is a diagram illustrating an example of the display of the game play screen.

FIG. 35 illustrates an example where a game play screen different from the game play screen depicted in the foregoing example is displayed on the window 402.

In this example, buildings 441 to 444 are visible outside the window 402.

In the above situation, while the thumb, the index finger, and the little finger of a hand 446 of the user are outstretched and the middle finger and the ring finger of the hand 446 of the user are bent, and the palm of the hand 446 faces upward, the user extends the hand 446 in a direction the user wants to fly a net 445.

In a case where the user state recognition section 32 accordingly recognizes the gesture made by the hand 446 of the user, the display control section 23 controls the display of content in such a manner as to display a video image of the net 445 flying in a direction indicated by the hand 446. Further, in a case where an object is present in the direction in which the net 445 flies, the display control section 23 exercises control in such a manner that content likely to be captured by the net 445 is superimposed on the object. In the case depicted in this example, the building 441 is targeted for attack. Therefore, the content likely to be captured by the net 445 is superimposed on the building 441.

Executing the earlier-described exact superimposition process in the above instance makes it easier for the user to control the direction in which the net 445 flies. Further, the net 445 is exactly superimposed on the building 441 as viewed from the user. This improves visual effects.

Figure 36:
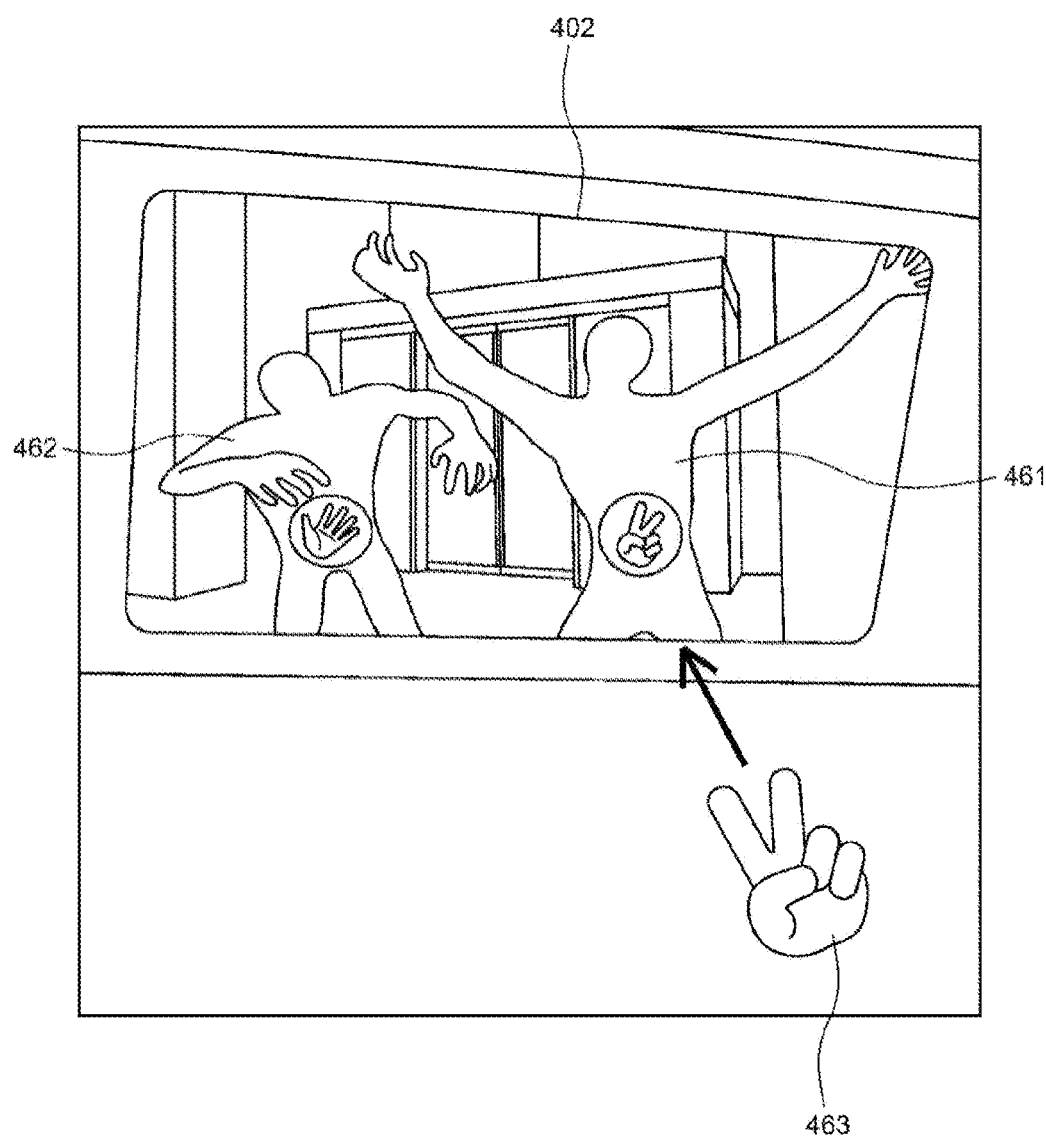
FIG. 36 is a diagram illustrating an example of the display of the game play screen.

FIG. 36 illustrates an example where a game play screen different from the game play screen depicted in the foregoing example is displayed on the window 402.

In this example, zombies 461 and 462 are displayed in such a manner as to match a scene visible from the window 402. In a case, for example, where a building's doorway is present in a scene visible from the window 402, the zombies 461 and 462 are displayed in such a manner as to indicate that they are coming out of the doorway. Further, a handprint effective in attacking is marked on each of the zombies 461 and 462. For example, a scissors handprint is marked on the zombie 461 as the handprint effective in attacking. For example, a paper handprint is marked on the zombie 462 as the handprint effective in attacking.

Figure 37:
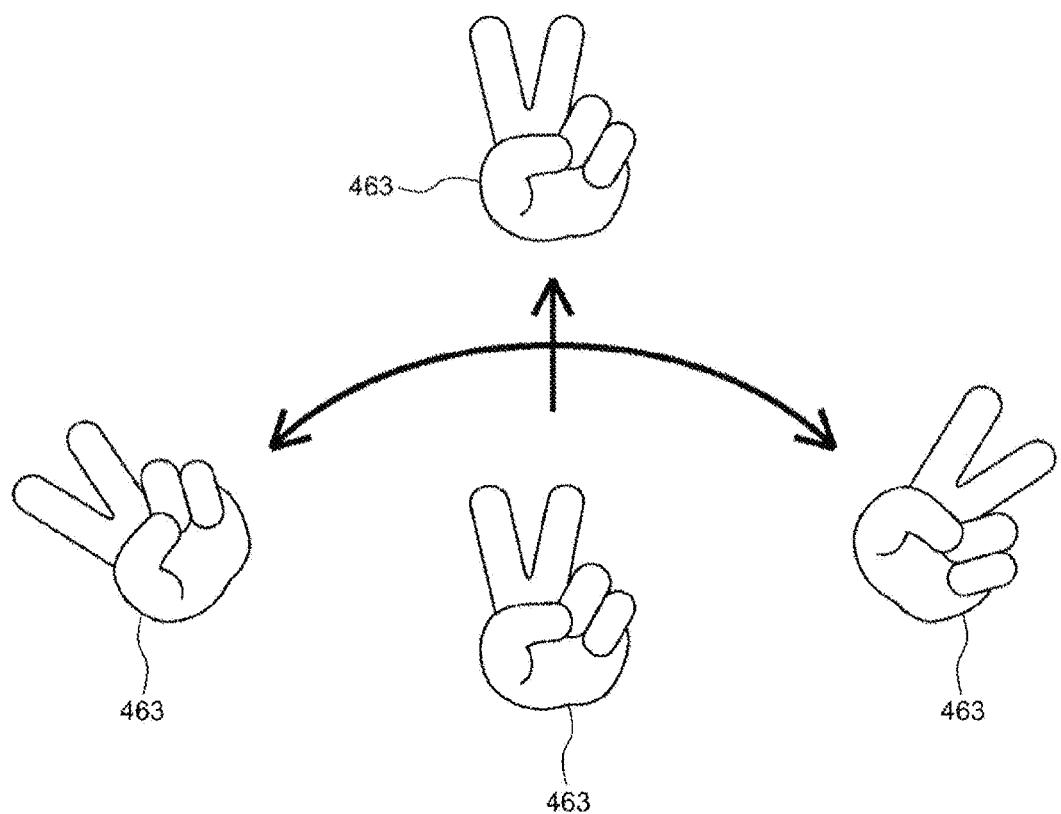
FIG. 37 is a diagram illustrating a game operating method.

In a case, for example, where the user attacks the zombie 461 in the above situation, the user uses a hand 463 of the user to form a scissors handprint effective in attacking the zombie 461 as depicted in FIG. 37. Then, the user moves the hand 463, for example, to the left or right or the like to orient the hand in a direction in which the zombie 461 is displayed. Eventually, the user is able to attack the zombie 461 by extending the hand 463 in the direction toward the zombie 461.

In a case where the user state recognition section 32 accordingly recognizes the above gesture made by the hand 463 of the user, the display control section 23 compares the direction of movement of the hand 463 and its handprint with the direction of display of the zombie 461 and the effective handprint. In a case where the direction of movement of the hand 463 and its handprint agree with the direction of display of the zombie 461 and the effective handprint, the display control section 23 controls the display of content in such a manner as to cause the zombie 461 to move in response to the attack and superimpose display effects indicative of the attack on the zombie 461.

As described above, the user is able to enjoy the game by making predetermined gestures while viewing the game play screen displayed superimposed on the scene visible from the window. Further, since the game play screen is superimposed on an actual scene visible from the window, the realistic sensations of the game increase.

Example Modification of Exact Superimposition Process

An example modification of the exact superimposition process will now be described with reference to FIGS. 38 to 41. In the example modification described below, the exact superimposition process is executed by use of a VPS (Visual Positioning System).

Figure 38:
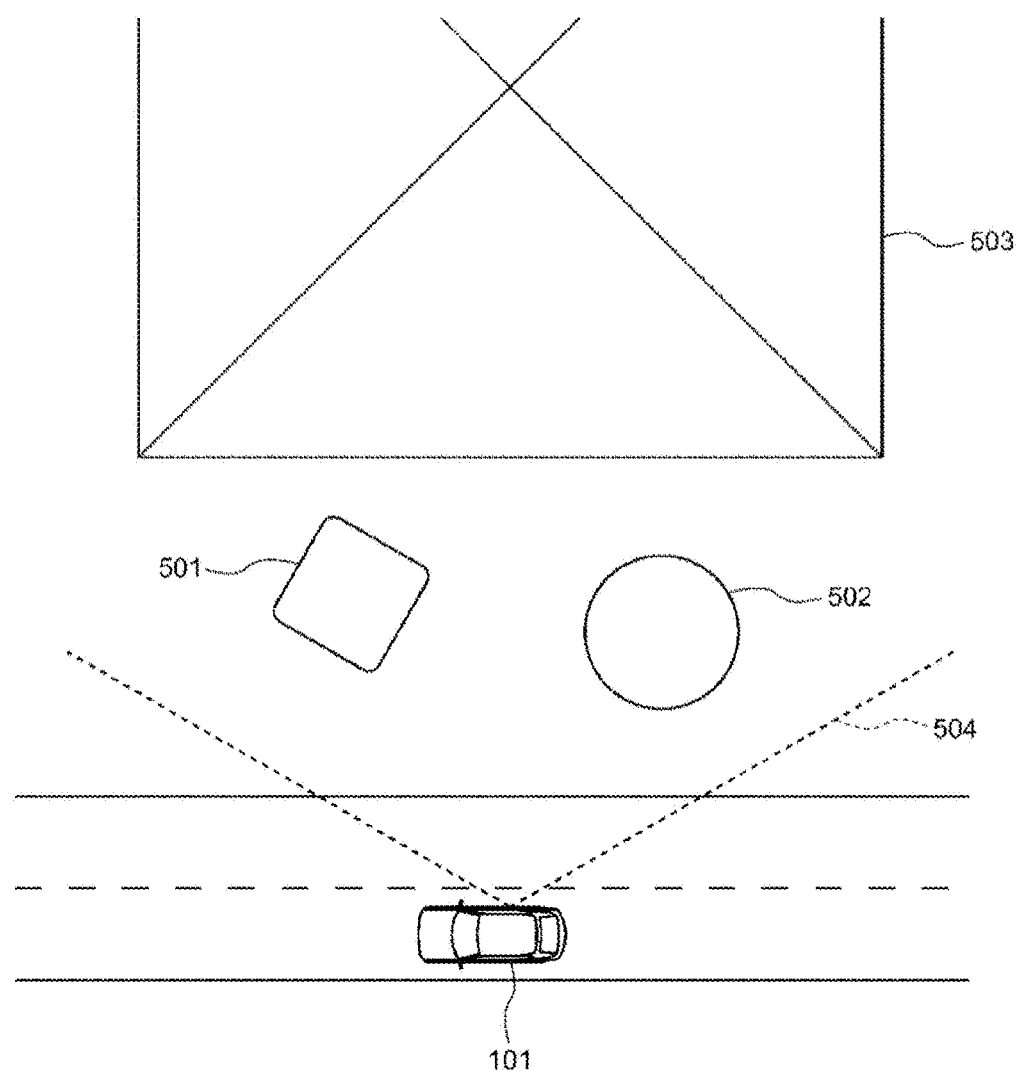
FIG. 38 is a diagram illustrating an example where content is displayed by use of a VPS.

The following describes a case where an image of a pyramid 503 is displayed as content within the field of view 504 of a user 521 (FIG. 40) in the vehicle 101 as depicted, for example, in FIG. 38. In this example, obstructions, namely, buildings 501 and 502, are present between the vehicle 101 and the pyramid 503.

First, the surroundings information recognition section 33 implements a VPS on the basis of images captured by the cameras 102, which capture images of the surroundings of the vehicle 101, in order to recognize a 3D space where the buildings 501 and 502 are present.

Figure 39:
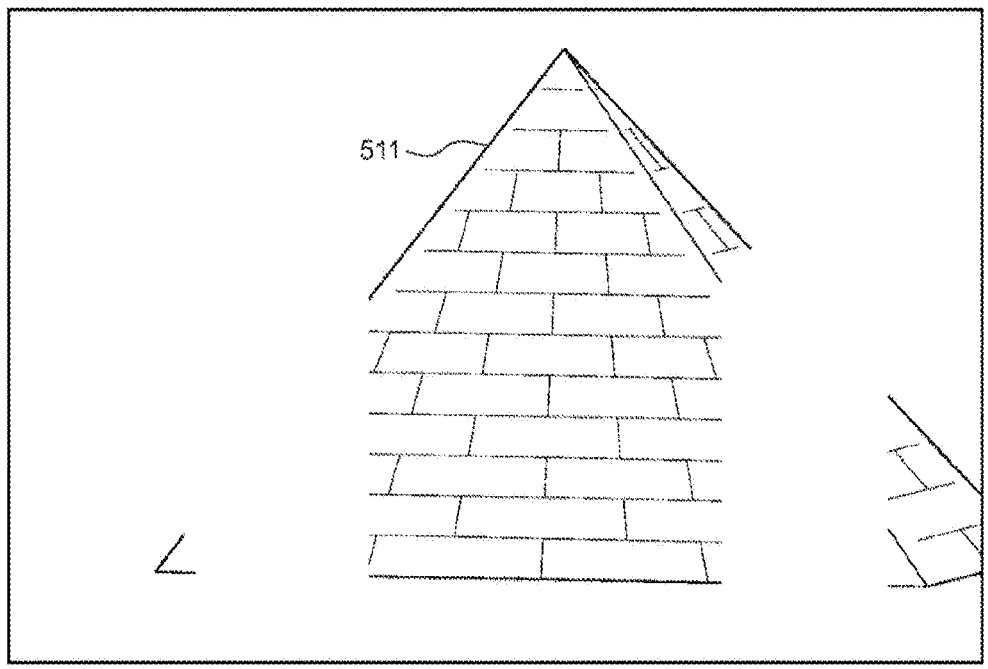
FIG. 39 is a diagram illustrating an example where content is displayed by use of the VPS.

The content control section 41 virtually installs a camera at the location of the user 521 in the 3D space recognized by the VPS. Then, the content control section 41 calculates, for example, the location and shape of the pyramid 503 in a case where an image of the pyramid 503, which is virtually disposed behind the buildings 501 and 502, is captured by the virtually installed camera as depicted in FIG. 38. On the basis of the result of the calculation by the content control section 41, the image processing section 42 generates an image 511 of the pyramid 503 that is depicted in FIG. 39. The generated image 511 is obtained by occluding the image 511 of the pyramid 503 according to the recognized locations and shapes of the buildings 501 and 502.

Figure 40:
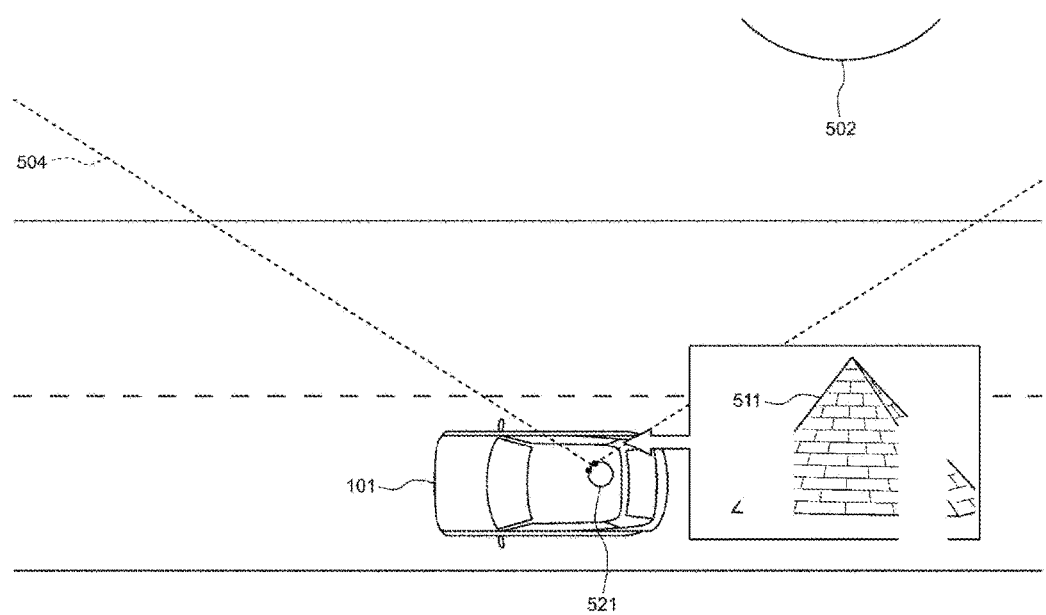
FIG. 40 is a diagram illustrating an example where content is displayed by use of the VPS.
Figure 41:
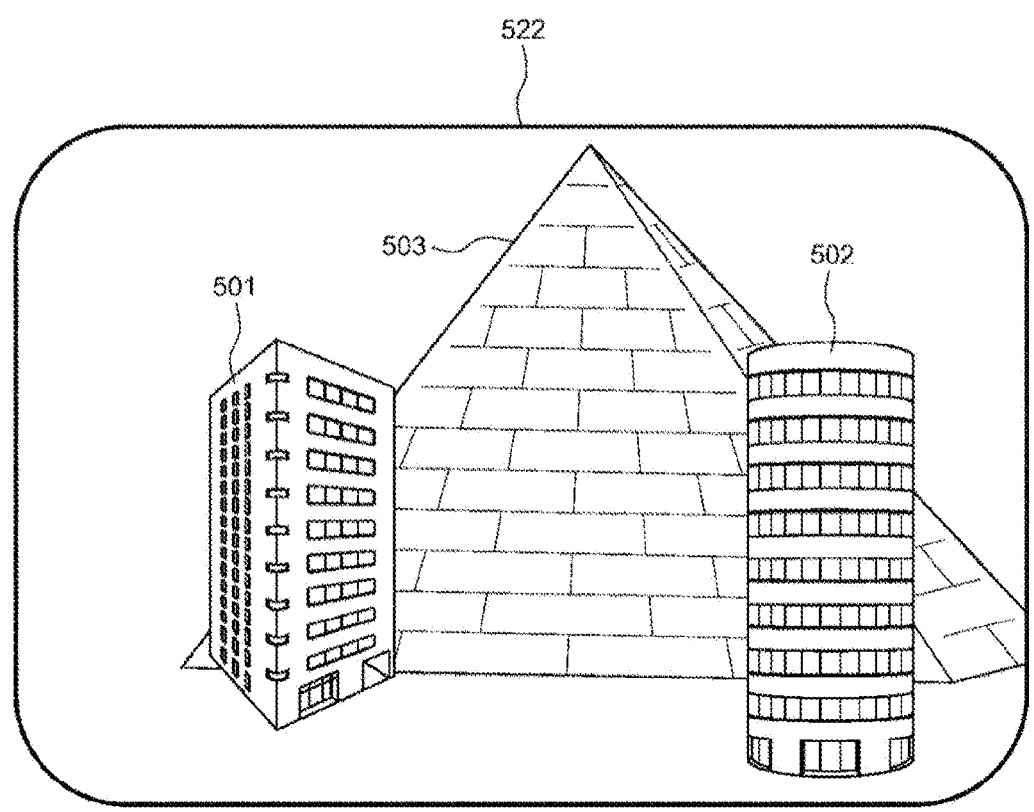
FIG. 41 is a diagram illustrating an example where content is displayed by use of the VPS.

Subsequently, as depicted in an enlarged view presented in FIG. 40, the output control section 43 causes the image 511 to be displayed on a window 522 in the right rear of the vehicle 101. Consequently, the pyramid 503 visible to the user 521 looking out of the window 522 is exactly superimposed behind the buildings 501 and 502 as depicted in FIG. 41.

Second Embodiment of Content Display Process

Figure 42:
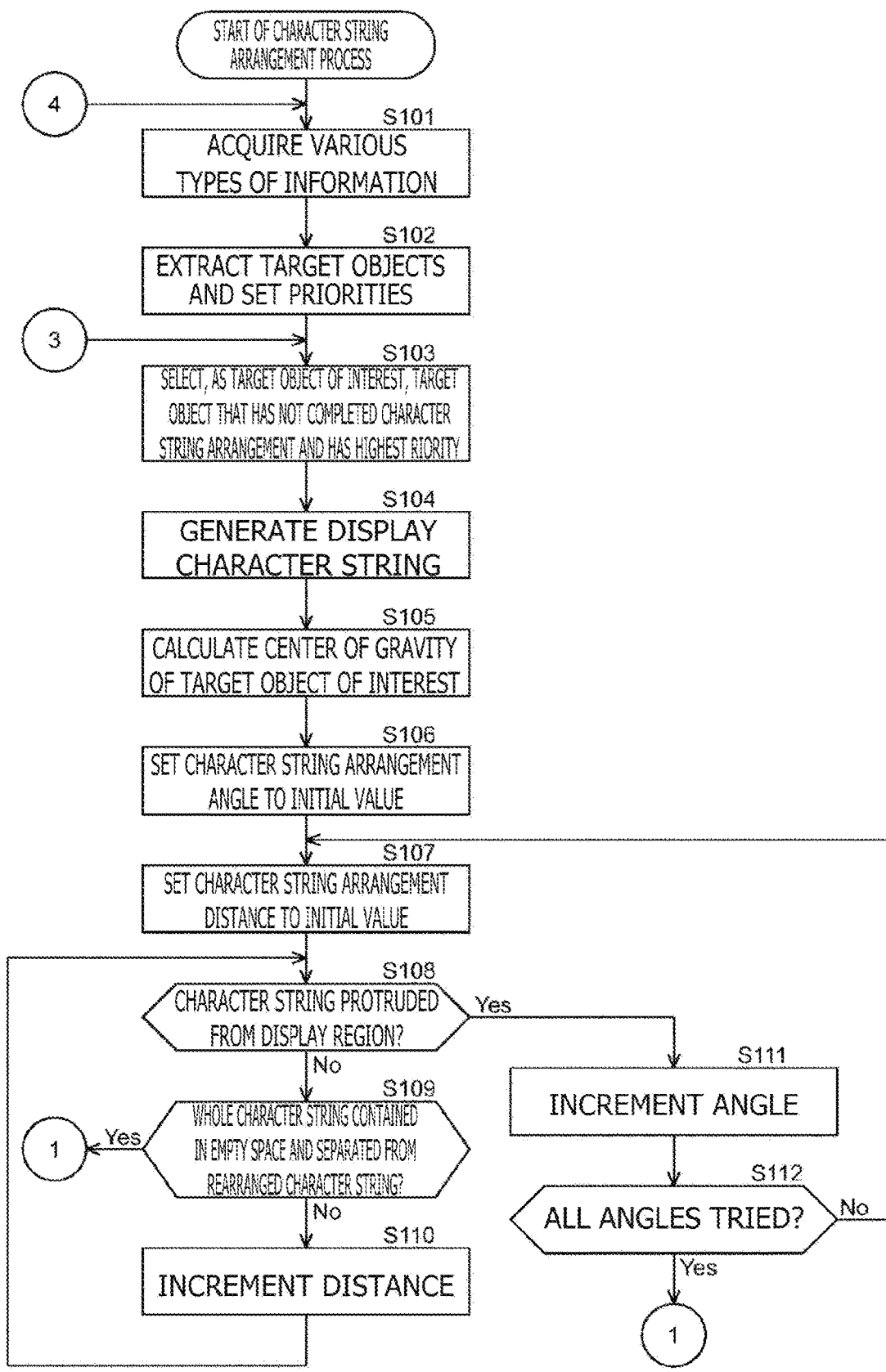
FIG. 42 is a flowchart illustrating a second embodiment of the content display process.
Figure 43:
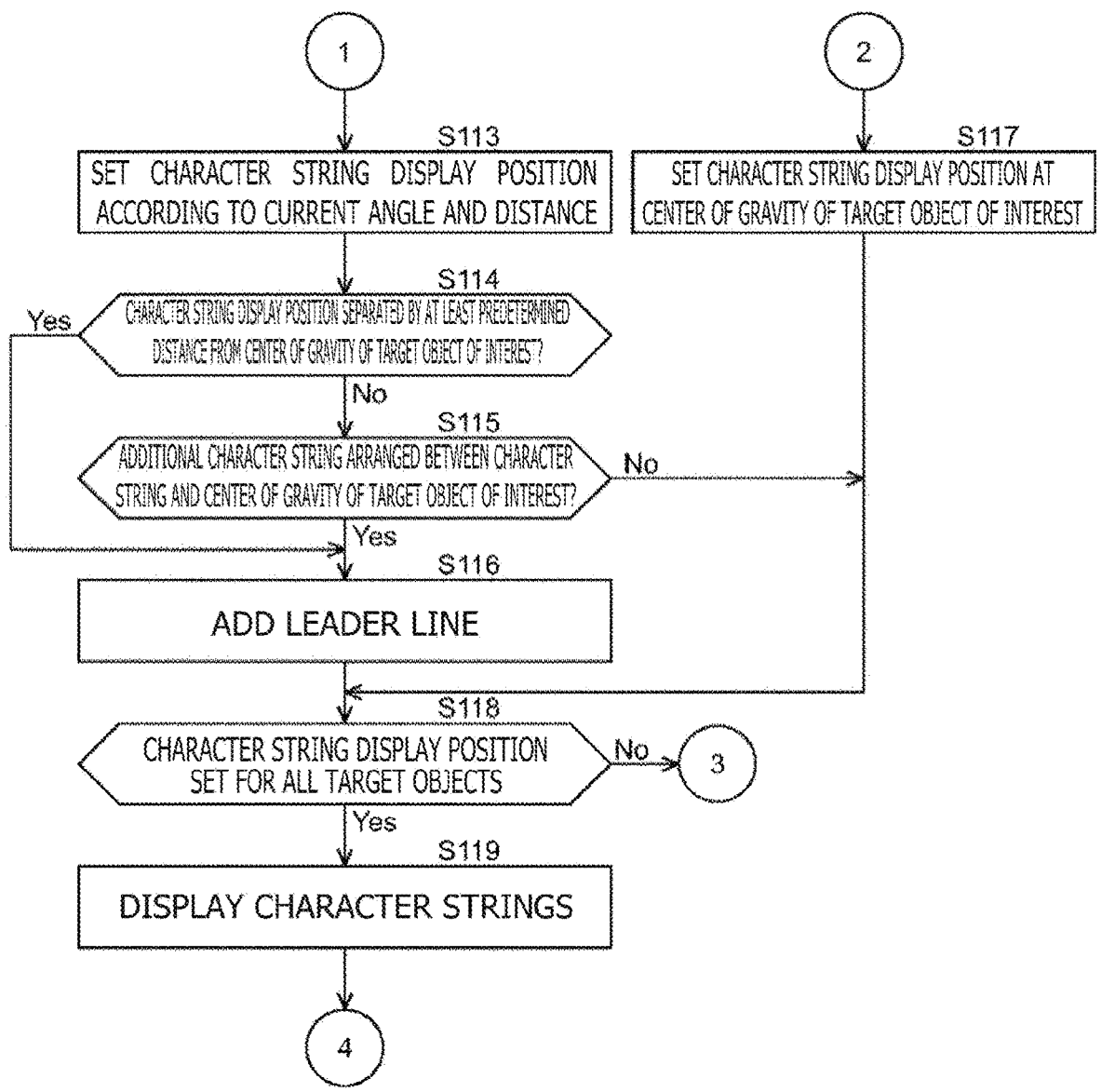
FIG. 43 is a flowchart illustrating the second embodiment of the content display process.

A second embodiment of the content display process executed by the information processing system 1 will now be described with reference to FIGS. 42 and 43.

This process starts, for example, when the user turns on the content display function by use of the input section 11 and ends when the user turns off the content display function.

Figure 9:
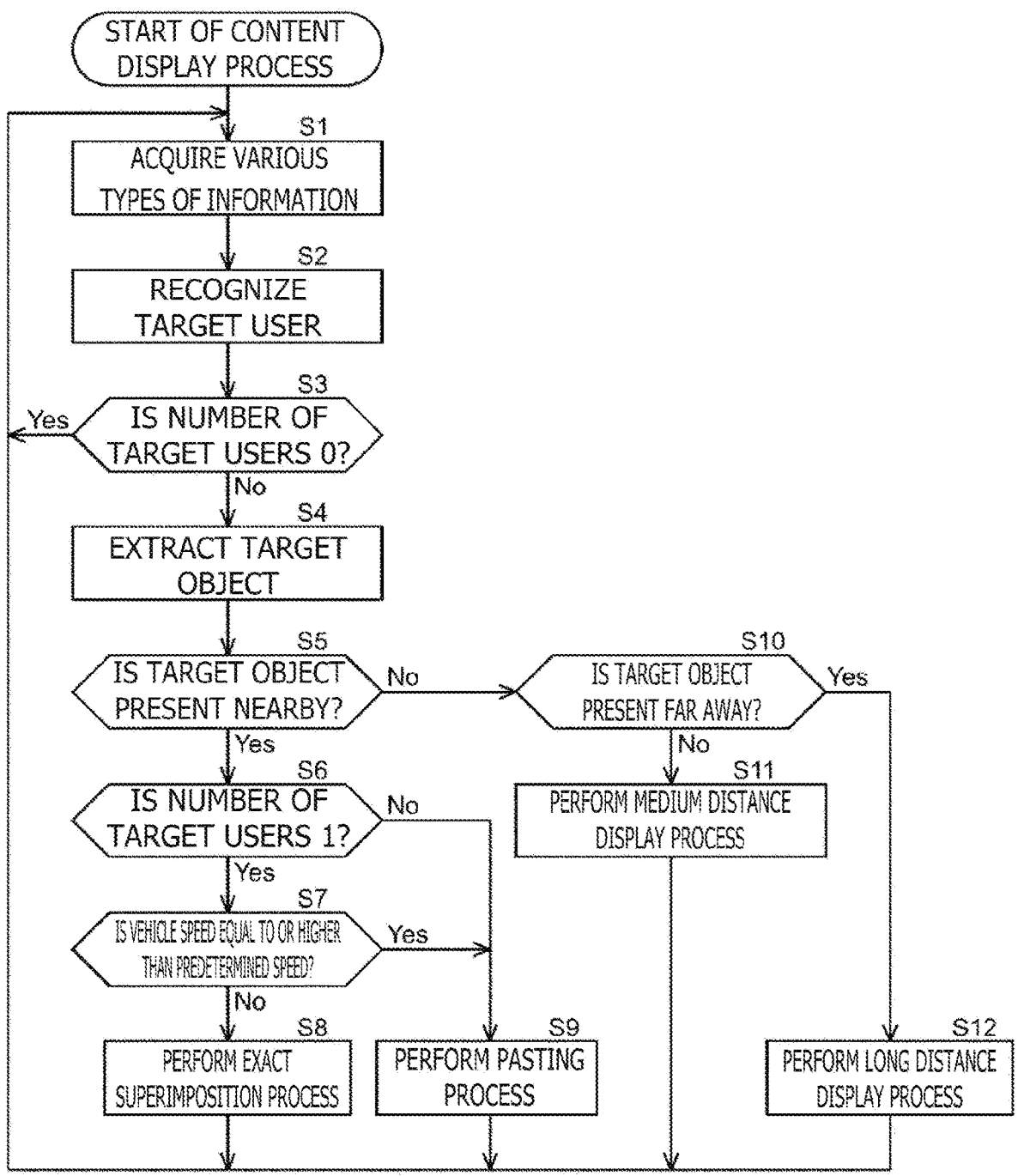
FIG. 9 is a flowchart illustrating a first embodiment of a content display process.

In step S101, various types of information is acquired, as is the case with the processing performed in step S1 of FIG. 9.

Figure 44:
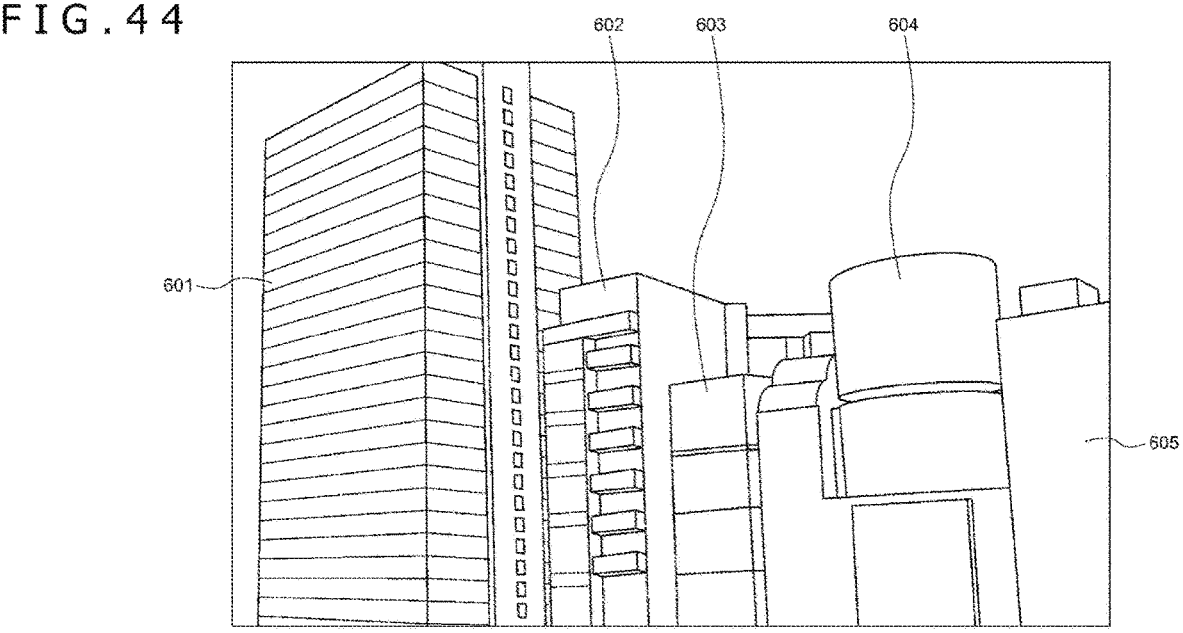
FIG. 44 is a diagram illustrating an example of a surroundings image.

The following describes a case where the surroundings image depicted in FIG. 44 is obtained by this content display process. In the surroundings image, buildings 601 to 605 are arranged from left to right.

Figure 45:
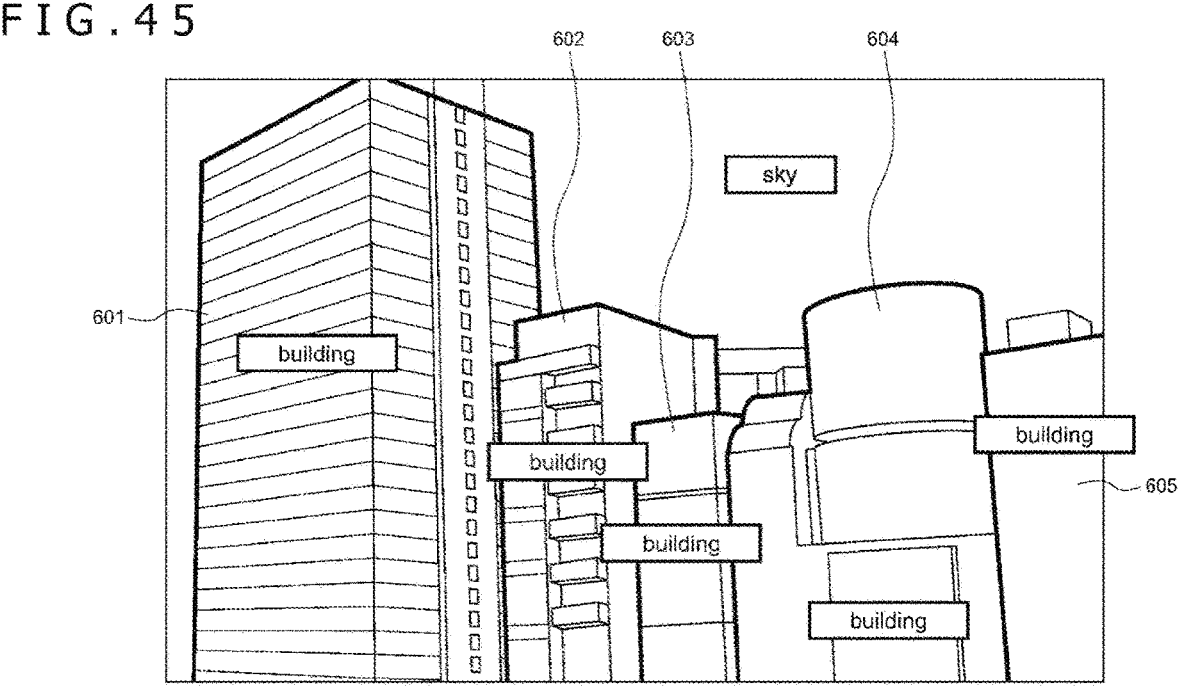
FIG. 45 is a diagram illustrating an example of a result of an object recognition process.

Further, for example, a semantic segmentation or other object recognition process is executed on the surroundings image depicted in FIG. 44. This results in recognizing regions where the buildings 601 to 605 and the sky are present, as depicted in FIG. 45.

In step S102, the content control section 41 extracts a target object that is targeted for information presentation, and sets a priority. For example, the surroundings information recognition section 33 extracts the target object from objects recognized in step S101 by performing a process similar to the processing in step S2 of FIG. 9.

The content control section 41 sets the priority of the extracted target object. It should be noted that the method of setting the priority is not specifically limited. The priority is set, for example, in the order of closeness to the line of sight of the user, that is, according to the level of user interest. Alternatively, the priority is set in the order of decreasing size of the area occupied in the surroundings image.

In step S103, the content control section 41 selects, as a target object of interest, a target object that has not completed character string arrangement and has the highest priority.

In step S104, the content control section 41 generates a character string that indicates information to be presented with respect to the target object of interest. For example, the content control section 41 generates the character string indicative of the name, type, and description of the target object of interest according to information or the like regarding the target object of interest that is acquired from the server outside the vehicle, the database in the vehicle, or the like.

Further, the content control section 41 sets the size of characters in the character string according to, for example, the priority of the target object of interest, or the like. It should be noted that a fixed value may be used to set the size of characters.

Further, the content control section 41 sets the number of lines for displaying the character string. For example, on the basis of a value obtained by dividing the number of characters in the character string by the maximum number of characters per line, the content control section 41 sets the number of lines for displaying the character string. It should be noted that the maximum number of characters per line may vary with the size of characters. Moreover, the number of lines for displaying the character string may be fixed at one without regard to the number of characters in the character string.

Setting the number of lines and the size of characters for the character string as described above determines the size of the display range of the character string.

In step S105, the content control section 41 calculates the center of gravity of the target object of interest. More specifically, the content control section 41 calculates the center of gravity of the target object of interest in a display region according to the surroundings image.

The above-mentioned display region is a region where content regarding a target object is displayed, such as the display panel 121 depicted in FIGS. 3A and 3B or the reflective film 132 depicted in FIGS. 4A, 4B, 5A, and 5B.

In step S106, the content control section 41 sets the angle of character string arrangement to an initial value. More specifically, the content control section 41 regards the center of gravity of the target object of interest as the center and sets the vertically upward direction to 0 degrees. Then, the content control section 41 sets an angle of 0 degrees as the angle of the center of gravity of the region for arranging the character string in the display region (hereinafter referred to as the character string's center of gravity) with respect to the center of gravity of the target object of interest.

It should be noted that the angle of the character string's center of gravity with respect to the center of gravity of the target object of interest is hereinafter referred to as the character string arrangement angle.

In step S107, the content control section 41 sets the distance for character string arrangement to an initial value. More specifically, the content control section 41 sets the distance between the center of gravity of the target object of interest and the character string's center of gravity to an initial value (e.g., 10 pixels).

It should be noted that the distance between the center of gravity of the target object of interest and the character string's center of gravity is hereinafter referred to as the character string arrangement distance.

In step S108, the content control section 41 determines whether or not the character string is protruded from the display region. More specifically, if the character string is entirely contained in the display region in a case where the character string's center of gravity is positioned as indicated by the currently set angle and distance, the content control section 41 determines that the character string is not protruded from the display region, and processing proceeds to step S109.

In step S109, the content control section 41 determines whether or not the whole character string is contained in an empty space and separated from a prearranged character string. More specifically, the content control section 41 determines whether or not, in a case where the character string's center of gravity is positioned as indicated by the currently set angle and distance, the whole character string is contained in the display region's empty space where the sky is present.

Further, the content control section 41 also determines whether or not, in the case where the character string's center of gravity is positioned as indicated by the currently set angle and distance, the character string overlaps with the prearranged character string. The prearranged character string is a character string that is provided for a target object having higher priority than the target object of interest and is assigned with an arrangement position earlier than the character string for the target object of interest.

Then, in a case where the content control section 41 determines that at least a part of the character string is excluded from the empty space or overlaps with the prearranged character string, processing proceeds to step S110.

In step S110, the content control section 41 increments the distance for character string arrangement. More specifically, the content control section 41 increments the distance for character string arrangement by a predetermined value (e.g., 10 pixels) without changing the character string arrangement angle.

Subsequently, processing returns to step S108. Steps S108 to S110 are then repeatedly executed until it is determined in step S108 that the character string is protruded from the display region or it is determined in step S109 that the whole character string is contained in the empty space and separated from the prearranged character string. That is, the content control section 41 searches for a position where the whole character string for the target object of interest is contained in the empty space and separated from the prearranged character string by gradually increasing the distance from the center of gravity of the target object of interest without changing the current angle.

Meanwhile, in a case where it is determined in step S108 that the character string is protruded from the display region, processing proceeds to step S111. This is the case where the currently set angle does not provide character string arrangement for allowing the whole character string to be contained in the empty space and separated from the prearranged character string.

In step S111, the content control section 41 increments the character string arrangement angle. More specifically, the content control section 41 rotates the character string arrangement angle of the target object of interest clockwise by a predetermined value (e.g., 10 degrees).

In step S112, the content control section 41 determines whether or not all angles are tried. In a case where the currently set angle is less than 360 degrees, the content control section 41 determines that all the angles are still not tried, and processing returns to step S107.

Subsequently, steps S107 to S112 are repeatedly executed until it is determined in step S109 that the whole character string is contained in the empty space and separated from the prearranged character string or it is determined in step S112 that all the angles are tried.

More specifically, the content control section 41 searches for a position where the whole character string for the target object of interest is contained in the empty space and separated from the prearranged character string by rotating the character string for the target object of interest clockwise around the center of gravity of the target object of interest by increments of a predetermined angle (e.g., 10 degrees) and moving the character string for the target object of interest by increments of a predetermined distance from the center of gravity of the target object of interest.

Figure 46:
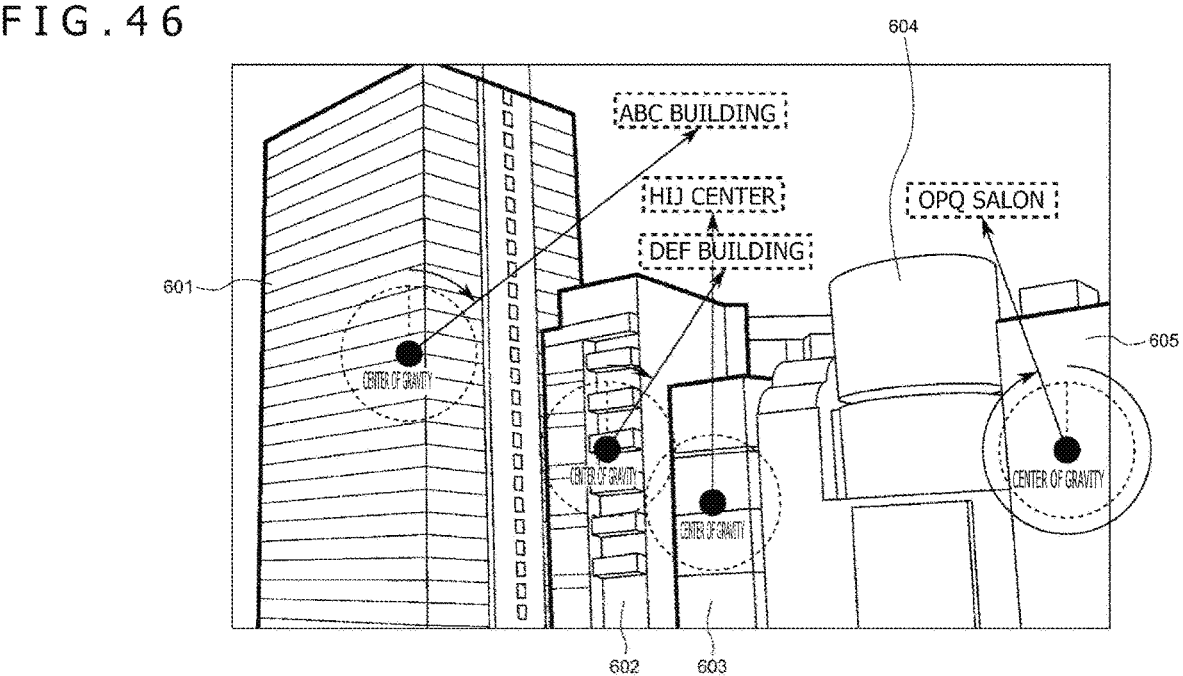
FIG. 46 is a diagram illustrating a method of setting arrangement of character strings.

Consequently, as depicted in FIG. 46, a search is conducted on the basis of the centers of gravity of the buildings 601 to 605 for the angle and distance that cause the character strings indicating the names of the buildings 601 to 605 to be contained in the empty space without overlapping with each other.

Meanwhile, in a case where it is determined in step S109 that the whole character string is contained in the empty space and separated from the prearranged character string, processing proceeds to step S113.

In step S113, the content control section 41 sets the display position of the character string according to the current angle and distance.

In step S114, the content control section 41 determined whether or not the display position of the character string is separated by a predetermined or longer distance from the center of gravity of the target object of interest. In a case where it is determined that the display position of the character string is not separated by the predetermined or longer distance from the center of gravity of the target object of interest, processing proceeds to step S115.

In step S115, the content control section 41 determines whether or not an additional character string is arranged between the character string and the center of gravity of the target object of interest. In a case where the character string of a prearranged additional character string is present between the character string of the target object of interest and the center of gravity of the target object of interest, the content control section 41 determines that an additional character string is arranged between the character string and the center of gravity of the target object of interest, and processing proceeds to step S116.

Meanwhile, in a case where it is determined in step S114 that the display position of the character string is separated by the predetermined or longer distance from the center of gravity of the target object of interest, processing skips step S115 and proceeds to step S116.

In step S116, the content control section 41 adds a leader line. More specifically, on the basis of the display position of the character string, the content control section 41 calculates the display position of the leader line that connects the character string to the center of gravity of the target object of interest.

Figure 47:
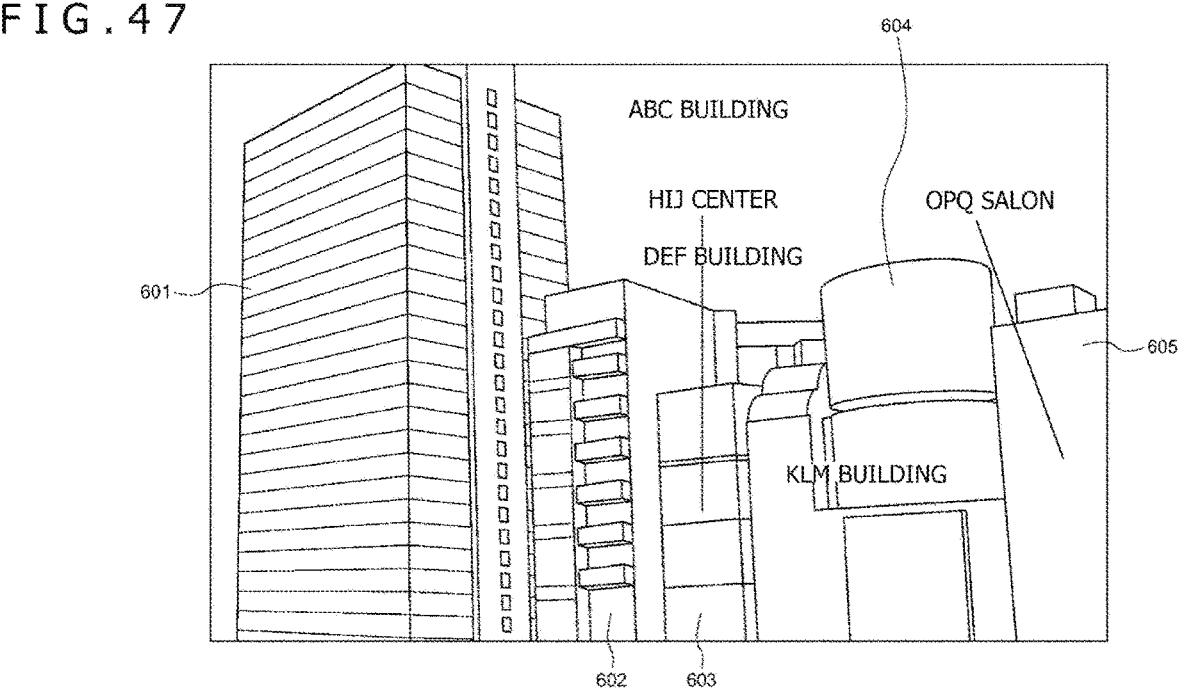
FIG. 47 is a diagram illustrating an example of character string display.

For instance, in the example of FIG. 47, the character string "DEF building," which indicates the name of the building 602, is arranged between the center of gravity of the building 603 and the character string "HIJ center," which indicates the name of the building 603. Therefore, the leader line connects the character string "HIJ center" to the center of gravity of the building 603.

Further, for example, the character string "OPQ salon" which indicates the name of the building 605 is separated from the center of gravity of the building 605. Therefore, the leader line connects the character string "OPQ salon" to the center of gravity of the building 605.

Consequently, the correspondence between each target object and the character string is easily understandable.

Subsequently, processing proceeds to step S118.

Meanwhile, in a case where it is determined in step S115 that no additional character string is arranged between the character string and the center of gravity of the target object of interest, processing skips step S116 and proceeds to step S118.

Further, in a case where the currently set angle is 360 degrees or more, the content control section 41 determines in step S112 that all angles are tried, and processing proceeds to step S117. This is the case where no appropriate position is found for causing the whole character string for the target object of interest to be contained in the empty space without overlapping with the prearranged character string.

In step S117, the content control section 41 sets the display position of the character string to the center of gravity of the target object of interest. More specifically, the content control section 41 sets the position for displaying the character string in the display region in such a manner that the center of gravity of the display range of the character string coincides with the center of gravity of the target object of interest.

Subsequently, processing proceeds to step S118.

In step S118, the content control section 41 determines whether or not the display position of the character string is set for all target objects. In a case where it is determined that the display position of the character string is still not set for all the target objects, processing returns to step S103.

Subsequently, steps S103 to S118 are repeatedly executed until it is determined in step S118 that the display position of the character string is set for all the target objects.

Meanwhile, in a case where it is determined in step S118 that the display position of the character string is set for all the target objects, processing proceeds to step S119.

In step S119, the information processing system 1 displays the character strings. More specifically, the image processing section 42 generates the content image data for displaying the character string and leader line for each target object according to the description, character size, number of lines, and display position of the character string for each target object and the display position of the leader line, which are set by the content control section 41.

The output control section 43 supplies the content image data, which is generated by the image processing section 42, to the display section 13.

The display section 13 displays the character string and the leader line for each target object according to the content image data. As a result, within the target user's field of view, the character strings and the leader lines are superimposed on the target objects outside the window.

Subsequently, processing returns to step S1 and executes steps S1 and beyond.

As described above, the character strings representing the information regarding a plurality of target objects can be appropriately arranged. Further, since the individual character strings are displayed in the sky wherever possible, it is easy for each user to read the character strings.

2. Advantages of Present Technology

As described above, when content is to be superimposed on a scene outside the vehicle, the description, display position, motion, and method of display of the content are controlled according to, for example, the state of a user, the state of the vehicle, and the location of a target object. This increases content visibility to the user. As a result, a greater amount of information can be accurately conveyed to the user.

Additionally, a plurality of users is able to simultaneously view the content without feeling uncomfortable. As a result, the plurality of users is able to quickly share accurate information regarding, for example, the scene outside the vehicle or the like.

3. Modifications

Modifications of the above-described embodiments of the present technology are described below.

For example, the description of the content may be controlled on the basis of not only the distance to the target object, but also the size of the target object.

The display surface on which the content is displayed need not necessarily be transparent, but may be translucent as long as light from the outside of the mobile body can be transmitted to make a scene outside the vehicle viewable through the display surface.

The direction of content superimposition is not specifically limited by the present technology. The present technology is also applicable, for example, to a case where the content is to be superimposed on a scene in front of the vehicle that is visible to a driver of the vehicle through the windshield.

The mobile body to which the present technology is applicable is not limited to a vehicle. The present technology is applicable, for example, to any mobile body that allows users in the mobile body to view a scene outside the mobile body through a window. For example, the present technology can be applied to trains, ships, airplanes, and the like.

4. Others

Example Configuration of Computer

The above-described series of processes can be performed by hardware and by software. In a case where the series of processes is to be performed by software, a program included in the software is installed on a computer. Here, the computer may be a computer incorporated in dedicated hardware or a general-purpose personal computer or other computers capable of performing various functions as long as various programs are installed on the computer.

Figure 48:
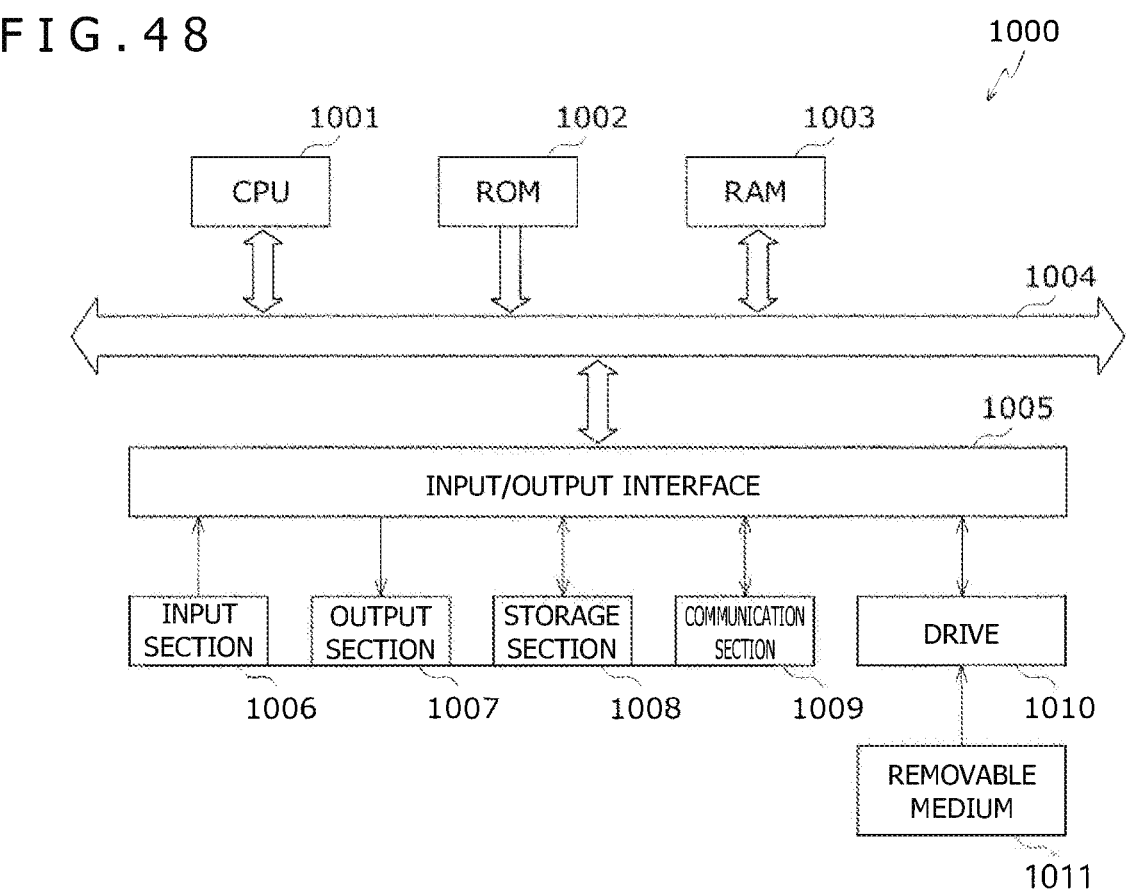
FIG. 48 is a diagram illustrating an example configuration of a computer.

FIG. 48 is a block diagram illustrating an example hardware configuration of a computer that executes a program for performing the above-described series of processes.

In the computer 1000, a CPU (Central Processing Unit) 1001, a ROM (Read Only Memory) 1002, and a RAM (Random Access Memory) 1003 are interconnected by a bus 1004.

The bus 1004 is further connected to an input/output interface 1005. The input/output interface 1005 is connected to an input section 1006, an output section 1007, a recording section 1008, a communication section 1009, and a drive 1010.

The input section 1006 includes, for example, an input switch, a button, a microphone, and an imaging element. The output section 1007 includes, for example, a display and a speaker. The recording section 1008 includes, for example, a hard disk and a nonvolatile memory. The communication section 1009 includes, for example, a network interface. The drive 1010 drives a removable medium 1011 such as a magnetic disk, an optical disk, a magneto-optical disk, or a semiconductor memory.

In the computer 1000 configured as described above, the CPU 1001 performs the above-described series of processes, for example, by loading a program recorded in the recording section 1008 into the RAM 1003 through the input/output interface 1005 and the bus 1004, and executing the loaded program.

The program to be executed by the computer 1000 (CPU 1001) can be recorded in and supplied on the removable medium 1011, which is formed as a package medium or the like. Further, the program can be supplied through a wired or wireless transmission medium such as a local area network, the Internet, or a digital satellite broadcasting system.

The computer 1000 is configured such that the program can be installed in the recording section 1008 through the input/output interface 1005 when the removable medium 1011 is loaded into the drive 1010. Further, the program can be received by the communication section 1009 through a wired or wireless transmission medium and installed in the recording section 1008. Moreover, the program can be preinstalled in the ROM 1002 or the recording section 1008.

It should be noted that the program to be executed by the computer may perform processing in a chronological order described in this document or perform processing in a parallel manner or at a necessary time point in response, for example, to a program call.

Further, the term "system," which is used in this document, refers to an aggregate of a plurality of component elements (e.g., apparatuses and modules (parts)), and is applicable no matter whether all the component elements are within the same housing. Therefore, the term "system" may refer not only to a plurality of apparatuses accommodated in separate housings and connected through a network, but also to a single apparatus including a plurality of modules accommodated in a single housing.

Furthermore, the embodiments of the present technology are not limited to the above-described embodiments, and may be variously modified without departing from the spirit of the present technology.

For example, the present technology can be configured for cloud computing in which one function is shared by a plurality of apparatuses through a network in order to perform processing in a collaborative manner.

Moreover, each step described with reference to the foregoing flowcharts may be not only performed by one apparatus but also performed in a shared manner by a plurality of apparatuses.

Additionally, in a case where a plurality of processes is included in a single step, the plurality of processes included in such a single step may be not only performed by one apparatus but also performed in a shared manner by a plurality of apparatuses.

Examples of Combined Configurations

The following configurations can also be adopted by the present technology.

(1)

An information processing apparatus including:
 a recognition section that recognizes a scene visible from within a mobile body through a transparent or translucent display surface provided in the mobile body; and
 a display control section that controls display of content on the display surface according to the recognized scene.

(2)

The information processing apparatus according to (1) above,
 in which the recognition section recognizes at least one of a state of the mobile body and a state of a user in the mobile body, and
 the display control section controls the display of the content according to at least one of the state of the mobile body and the state of the user in the mobile body.

(3)

The information processing apparatus according to (2) above,
 in which the recognition section recognizes a target user that is a user in the mobile body, the target user being targeted for the display of the content, and
 the display control section controls the display of the content further according to a result of recognition of the target user.

(4)

The information processing apparatus according to (3) above,
 in which the recognition section recognizes at least one of the number, a position, a line of sight, a face orientation, and a motion of the target user, and
 the display control section controls at least one of a description, a display position, a motion, and a method of display of the content according to the result of recognition by the recognition section.

(5)

The information processing apparatus according to (4) above,
 in which, in a case where the number of the target user is one and a speed of the mobile body is equal to or lower than a predetermined threshold, the display control section exactly superimposes the content on the scene.

(6)

The information processing apparatus according to (4) or (5) above,
 in which the content includes a game play screen, and
 the display control section controls a motion of the game play screen according to the recognized scene and the motion of the target user.

(7)

The information processing apparatus according to any one of (3) to (6) above,
 in which the recognition section recognizes the target user according to at least one of a position, a line of sight, and a face orientation of the user in the mobile body.

(8)
The information processing apparatus according to any one of (2) to (7) above,
in which the display control section controls at least one of a description, a display position, a motion, and a method of display of the content according to a speed of the mobile body.

(9)
The information processing apparatus according to any one of (1) to (8) above,
in which the recognition section extracts a target object that is targeted for information presentation in the scene, and
the content includes presentation information that is to be presented with respect to the target object.

(10)
The information processing apparatus according to (9) above,
in which the recognition section recognizes a distance between the mobile body and the target object, and
the display control section controls at least one of a description, a display position, and a method of display of the presentation information according to the distance between the mobile body and the target object.

(11)
The information processing apparatus according to (9) or (10) above,
in which the presentation information includes at least one of an attribute of the target object and a display item indicating a location of the target object in the scene.

(12)
The information processing apparatus according to any one of (9) to (11) above,
in which the display control section controls a display position of the presentation information according to locations of the target object and a sky in the scene.

(13)
The information processing apparatus according to any one of (1) to (12) above,
in which the content includes related information that is information regarding the scene and an object in the scene.

(14)
The information processing apparatus according to (13) above,
in which the related information includes at least one of past or future information regarding at least one of the scene and the object in the scene and information regarding an object that is present in a space different from the scene and related to at least one of the scene and the object in the scene.

(15)
The information processing apparatus according to any one of (1) to (14) above,
in which the display control section controls at least one of a description, a display position, a motion, and a method of display of the content.

(16)
The information processing apparatus according to any one of (1) to (15) above,
in which the display control section generates an image of an object virtually disposed in the scene by occluding obstructions being present between the object and the mobile body, and controls display of the generated image on the display surface.

(17)
The information processing apparatus according to any one of (1) to (16) above,
in which the display surface forms at least a part of a window of the mobile body.

(18)
An information processing method including:
recognizing a scene visible from within a mobile body through a transparent or translucent display surface provided in the mobile body; and
controlling display of content on the display surface according to the recognized scene.

(19)
A program for causing a computer to execute a process including:
recognizing a scene visible from within a mobile body through a transparent or translucent display surface provided in the mobile body; and
controlling display of content on the display surface according to the recognized scene.

(20)
An information processing system including:
a display section that includes a transparent or translucent display surface for transmitting light from an outside of a mobile body;
a recognition section that recognizes a scene visible from within the mobile body through the display surface; and
a display control section that controls display of content on the display surface according to the recognized scene.

It should be noted that the advantages described in this document are merely illustrative and not restrictive. The present technology can provide additional advantages.

REFERENCE SIGNS LIST

1: Information processing system
11: Input section
12: Information processing section
13: Display section
22: Recognition section
23: Display control section
31: Vehicle information recognition section
32: User state recognition section
33: Surroundings information recognition section
41: Content control section
42: Image processing section
43: Output control section
101: Vehicle
102-1L to 102-4: RGB camera
103-1L to 103-2R: ToF camera
121: Display panel
131: Short throw projector
132: Reflective film
133: Window
141: Display

The invention claimed is:
1. An information processing apparatus, comprising:
a recognition section configured to:
recognize a scene visible from within a mobile body, wherein the scene is visible from within the mobile body through one of a transparent display surface or a translucent display surface of a side window of the mobile body;
extract a target object in the scene; and
recognize a distance between the mobile body and the target object; and a display control section configured to:
control display of content on the one of the transparent display surface or the translucent display surface based on the recognized scene,
wherein the content includes presentation information presented with respect to the target object;
control a display position of the presentation information based on the distance between the mobile body and the target object; and
control a positional relation between the display position of the presentation information and a position of the target object, based on the distance between the mobile body and the target object.

2. The information processing apparatus according to claim 1, wherein
the recognition section is further configured to recognize at least one of a state of the mobile body or a state of a user in the mobile body, and
the display control section is further configured to control the display of the content based on the at least one of the state of the mobile body or the state of the user in the mobile body.

3. The information processing apparatus according to claim 2, wherein
the recognition section is further configured to recognize the user as a target user in the mobile body, and
the display control section is further configured to control the display of the content for the target user based on a result of recognition of the target user.

4. The information processing apparatus according to claim 3, wherein
the recognition section is further configured to recognize at least one of a number of target users in the mobile body, a position of the target user of the number of target users in the mobile body, a line of sight of the target user, a face orientation of the target user, or a motion of the target user, and
the display control section is further configured to control, based on the at least one of the number of target users, the position of the target user, the line of sight of the target user, the face orientation of the target user, or the motion of the target user, at least one of a description of the content, a display position of the content, a motion of the content, or a method of the display of the content.

5. The information processing apparatus according to claim 4, wherein, in a case where the number of target users is one and a speed of the mobile body is equal to or lower than a specific threshold, the display control section is further configured to exactly superimpose the content on the scene.

6. The information processing apparatus according to claim 4, wherein
the content includes a game play screen, and
the display control section is further configured to control a motion of the game play screen, based on the recognized scene and the motion of the target user.

7. The information processing apparatus according to claim 3, wherein the recognition section is further configured to recognize the target user based on at least one of a position of the user in the mobile body, a line of sight of the user, and a face orientation of the user in the mobile body.

8. The information processing apparatus according to claim 2, wherein the display control section is further configured to control, based on a speed of the mobile body, at least one of a description of the content, a display position of the content, a motion of the content, or a method of the display of the content.

9. The information processing apparatus according to claim 1, wherein the display control section is further configured to control, based on the distance between the mobile body and the target object, at least one of a description of the presentation information or a method of display of the presentation information.

10. The information processing apparatus according to claim 1, wherein the presentation information includes at least one of an attribute of the target object or a display item indicating a location of the target object in the scene.

11. The information processing apparatus according to claim 1, wherein the display control section is further configured to control the display position of the presentation information, based on locations of the target object and a sky in the scene.

12. The information processing apparatus according to claim 1, wherein
the content further includes related information, and
the related information is regarding the scene and a first object in the scene.

13. The information processing apparatus according to claim 12, wherein
the related information includes:
at least one of past information or future information regarding at least one of the scene or the first object in the scene, and
information regarding a second object that is present in a space different from the scene, and
the second object is related to at least one of the scene or the first object in the scene.

14. The information processing apparatus according to claim 1, wherein the display control section is further configured to control at least one of a description of the content, a display position of the content, a motion of the content, and a method of the display of the content.

15. The information processing apparatus according to claim 1, wherein the display control section is further configured to:
generate an image of an object virtually disposed in the scene, by occlusion of obstructions present between the object and the mobile body; and
control display of the generated image on the one of the transparent display surface or the translucent display surface.

16. An information processing method, comprising:
recognizing a scene visible from within a mobile body,
wherein the scene is visible from within the mobile body through one of a transparent display surface or a translucent display surface of a side window of the mobile body;
extracting a target object in the scene;
recognizing a distance between the mobile body and the target object;
controlling display of content on the one of the transparent display surface or the translucent display surface based on the recognized scene,
wherein the content includes presentation information presented with respect to the target object;
controlling a display position of the presentation information based on the distance between the mobile body and the target object; and
controlling a positional relation between the display position of the presentation information and a position of the target object, based on the distance between the mobile body and the target object.

17. A non-transitory computer-readable medium having stored thereon, computer-executable instructions which, when executed by a computer, cause the computer to execute operations, the operations:

recognizing a scene visible from within a mobile body,
wherein the scene is visible from within the mobile body through one of a transparent display surface or a translucent display surface of a side window of the mobile body;

extracting a target object in the scene;

recognizing a distance between the mobile body and the target object;

controlling display of content on the one of the transparent display surface or the translucent display surface based on the recognized scene,
wherein the content includes presentation information presented with respect to the target object;

controlling a display position of the presentation information based on the distance between the mobile body and the target object; and controlling a positional relation between the display position of the presentation information and a position of the target object, based on the distance between the mobile body and the target object.

18. An information processing system, comprising:

a display section that includes one of a transparent display surface or a translucent display surface of a side window of a mobile body,
wherein the one of the transparent display surface or the translucent display surface is configured to transmit light from an outside of the mobile body;

a recognition section configured to:
recognize a scene visible from within the mobile body,
wherein the scene is visible from within the mobile body through the one of the transparent display surface or the translucent display surface of the side window;
extract a target object in the scene; and
recognize a distance between the mobile body and the target object; and a display control section configured to:
control display of content on the one of the transparent display surface or the translucent display surface based on the recognized scene,
wherein the content includes presentation information presented with respect to the target object;
control a display position of the presentation information based on the distance between the mobile body and the target object; and
control a positional relation between the display position of the presentation information and a position of the target object, based on the distance between the mobile body and the target object.

* * * * *